US012707287B2

(12) United States Patent
Shen

(10) Patent No.: US 12,707,287 B2
(45) Date of Patent: Aug. 11, 2026

(54) COMMUNICATION METHOD AND RELATED DEVICES

(71) Applicant: GUANGDONG OPPO MOBILE TELECOMMUNICATIONS CORP., LTD., Dongguan (CN)

(72) Inventor: Jia Shen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 710 days.

(21) Appl. No.: 18/047,625

(22) Filed: Oct. 18, 2022

(65) Prior Publication Data

US 2023/0066109 A1 Mar. 2, 2023

Related U.S. Application Data

(63) Continuation of application No. PCT/CN2020/085998, filed on Apr. 21, 2020.

(51) Int. Cl.
*H04W 52/14* (2009.01)
*H04L 41/16* (2022.01)
(Continued)

(52) U.S. Cl.
CPC ............. *H04W 24/02* (2013.01); *H04L 41/16* (2013.01); *H04W 72/20* (2023.01); *H04W 72/53* (2023.01)

(58) Field of Classification Search
CPC .......... G06N 20/00; G06N 3/08; G06N 3/063; G06N 3/04; G06N 5/02; G06N 5/04; G06N 3/082; G06N 99/00; G06T 1/20; G06T 1/60; H04W 28/02; H04W 28/20; G06F 3/06; G06F 9/50; G06F 9/48; H04L 12/46;
(Continued)

(56) References Cited

U.S. PATENT DOCUMENTS 8,953,532 B2 * 2/2015 Liu ...................... H04L 1/1893
370/329
2018/0124648 A1 * 5/2018 Park ................. H04W 36/0011
(Continued)

FOREIGN PATENT DOCUMENTS

CN 108924910 11/2018
CN 110908804 3/2020
(Continued)

OTHER PUBLICATIONS

"3rd Generation Partnership Project; Technical Specification Group Services and System Aspects; Study on traffic characteristics and performance requirements for AI/ML model transfer in 5GS (Release 18)," 3GPP TR 22.874, Nov. 2020, v0.2.0.
(Continued)

*Primary Examiner* — Quan M Hua
(74) *Attorney, Agent, or Firm* — Hodgson Russ LLP

(57) ABSTRACT

A communication method and related devices are provided. The method includes the following. A terminal transmits a first indicator to a network device. The first indicator identifies a first resource-parameter set, the first resource-parameter set includes a first communication resource parameter and a first artificial intelligence (AI) parameter, and the first indicator and the first resource-parameter set are in a first correspondence.

20 Claims, 7 Drawing Sheets

(51) Int. Cl.

| | |
|---|---|
| ***H04W 24/02*** | (2009.01) |
| ***H04W 72/20*** | (2023.01) |
| ***H04W 72/53*** | (2023.01) |

(58) Field of Classification Search

CPC ......... H04L 65/70; H04L 65/80; H04L 67/00; H04L 9/32

See application file for complete search history.

(56) References Cited

U.S. PATENT DOCUMENTS

| | | | | |
|---|---|---|---|---|
| 2019/0138908 | A1 | 5/2019 | Bernat et al. | |
| 2020/0007931 | A1 | 1/2020 | Ho et al. | |
| 2021/0182658 | A1 * | 6/2021 | Wang | G06N 3/045 |

FOREIGN PATENT DOCUMENTS

| | | | | |
|---|---|---|---|---|
| CN | 111010890 | | 4/2020 | |
| CN | 111034310 | | 4/2020 | |
| GB | 2603469 | A * | 8/2022 | H04L 41/16 |
| WO | 2009021422 | | 2/2009 | |
| WO | 2016119632 | | 8/2016 | |
| WO | WO-2018028714 | A1 * | 2/2018 | H04L 5/0094 |
| WO | WO-2018094712 | A1 * | 5/2018 | H04W 72/04 |

OTHER PUBLICATIONS

Oppo et al., "SID Proposal: Study on AI/ML Model Transfer in 5GS," 3GPP TSG-SA WG1 Meeting #88, S1-193479, Nov. 2019.

WIPO, International Search Report and Written Opinion for International Application No. PCT/CN2020/085998, Jan. 25, 2021.

EPO, Extended European Search Report for EP Application No. 20932266.8, Mar. 27, 2023.

EPO, Extended European Search Report for EP Application No. 25194991.3, Oct. 6, 2025.

* cited by examiner

COMMUNICATION METHOD AND RELATED DEVICES

CROSS-REFERENCE TO RELATED APPLICATION(S)

This application is a continuation of International Application No. PCT/CN2020/085998, filed Apr. 21, 2020, the entire disclosure of which is incorporated herein by reference.

TECHNICAL FIELD

This application relates to the field of wireless network communication technology, and particularly to a communication method and related devices.

RELATED ART

With development of wireless network communication technology, artificial intelligence (AI) is undertaking increasingly more important tasks in mobile communication terminals. For an AI scenario, how to provide resource indications to improve reliability of resource allocation has become a problem to be solved.

SUMMARY

Implementations of the disclosure provide a communication method and related devices, which can provide to the network device an indicator that is associated with both present wireless channel condition and present artificial intelligence (AI) parameter of the terminal, thereby ensuring reliability of resource allocation.

In a first aspect of implementations of the disclosure, a communication method is provided. The method includes the following. A terminal transmits a first indicator to a network device. The first indicator identifies a first resource-parameter set, the first resource-parameter set includes a first communication resource parameter and a first AI parameter, and the first indicator and the first resource-parameter set are in a first correspondence.

In a second aspect of implementations of the disclosure, a network device is provided. The network device includes a transceiver, a processor, and a memory. The memory stores computer programs which, when executed by the processor, are operable with the transceiver to receive a first indicator transmitted by a terminal. The first indicator identifies a first resource-parameter set, the first resource-parameter set includes a first communication resource parameter and a first AI parameter, and the first indicator and the first resource-parameter set are in a first correspondence.

In a third aspect of implementations of the disclosure, a terminal is provided. The terminal includes a transceiver, a processor, and a memory. The memory stores computer programs which, when executed by the processor, are operable with the transceiver to transmit a first indicator to a network device. The first indicator identifies a first resource-parameter set, the first resource-parameter set includes a first communication resource parameter and a first AI parameter, and the first indicator and the first resource-parameter set are in a first correspondence.

BRIEF DESCRIPTION OF THE DRAWINGS

In order to describe more clearly technical solutions of implementations of the disclosure, the following will give a brief introduction to the accompanying drawings used for describing the implementations.

DETAILED DESCRIPTION

The following will give a clear and detailed illustration of technical solutions of implementations of the disclosure with reference to the accompanying drawings in implementations of the disclosure.

Figure 1:
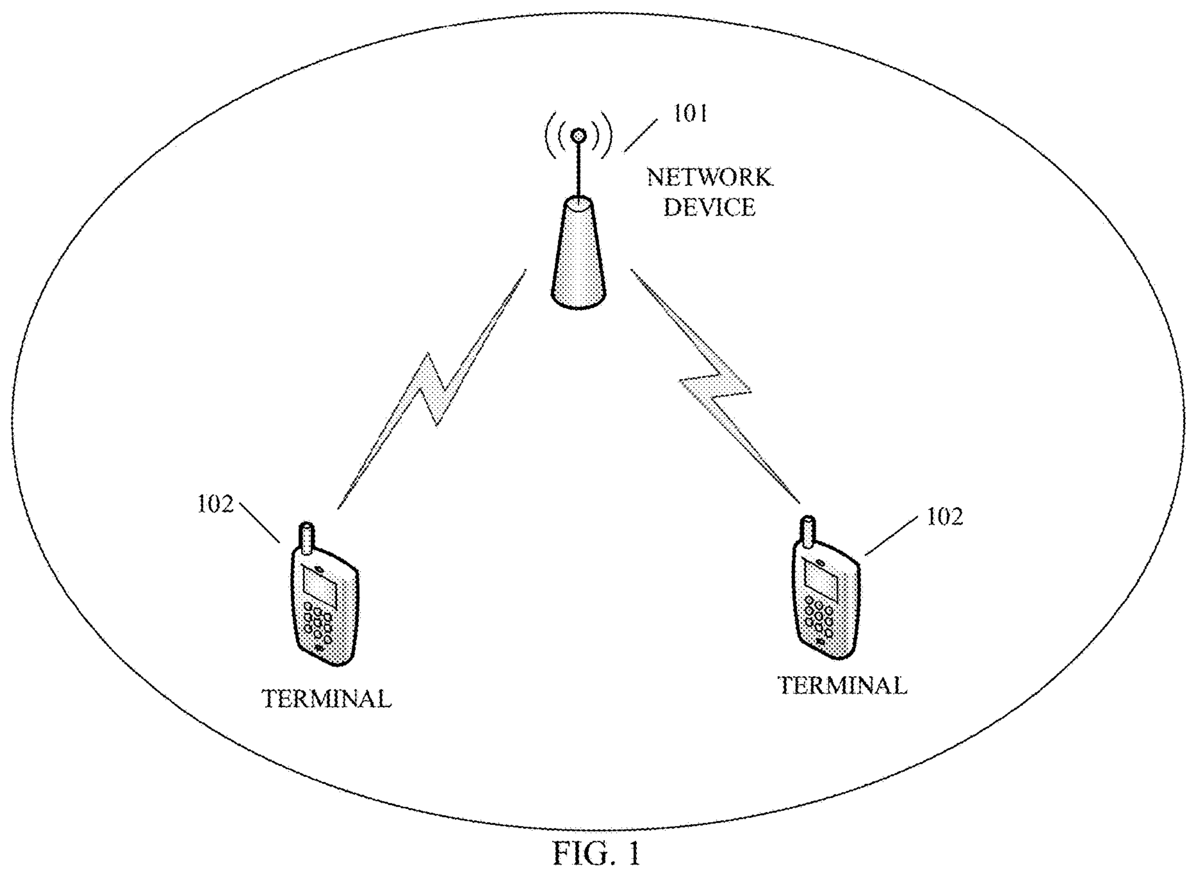
FIG. 1 is a schematic architectural diagram of a communication system provided in implementations of the disclosure.

Refer to FIG. 1, which is a schematic diagram of a communication architecture provided in implementations of the disclosure. The communication system includes a terminal and a network device. As illustrated in FIG. 1, the communication system may include one network device 101 and one or more terminals 102. The terminals 102 can communicate with the network device 101. The terminals 102 can also communicate with each other. The communication system may be a global system for mobile communication (GSM), a code division multiple access (CDMA) system, a wideband code division multiple access (WCDMA) system, a worldwide interoperability for microwave access (WiMAX) system, a long term evolution (LTE) system, a $5^{th}$ generation (5G) communication system (such as new radio (NR)), a communication system that integrates multiple communication technologies (such as communication system that integrates LTE technology and NR technology), or a future evolved communication system.

The form and quantity of the network device and the terminal illustrated in FIG. 1 are merely intended for illustration, and do not constitute limitation on implementations of the disclosure.

The terminals 102 can be scattered throughout the entire communication system, and each terminal 102 can be stationary or mobile. The terminal 102 may also be referred to by those skilled in the art as mobile station, subscriber station, mobile unit, subscriber unit, wireless unit, remote unit, mobile device, user equipment (UE), wireless device, wireless communication device, remote device, mobile subscriber station, access terminal, mobile terminal, wireless terminal, remote terminal, handheld device, user agent, mobile client, client, or some other appropriate terms. The terminal 102 may be a cellular phone, a personal digital assistant (PDA), a wireless modem, a wireless communication device, a handheld device, a tablet computer, a laptop computer, a cordless phone, a wireless local loop (WLL) station, etc. The terminal 102 can communicate with the network device 101 in the communication system.

The network device 101 can perform wireless communication with the terminal 102 via one or more antennas. The network device 101 can provide a communication coverage for its geographical area. The network device 101 may include different types such as a macro base station, a micro base station, a relay station, an access point, etc. In some implementations, a base station may be referred to by those skilled in the art as base station transceiver, wireless base station, access point, wireless transceiver, basic service set (BSS), extended service set (ESS), NodeB, evolved NodeB (eNB or eNodeB), or some other appropriate terms. Exemplarily, in a 5G system, the base station is called gNB.

The network device can allocate a resource to the terminal, such that the terminal can communicate on the allocated resource. Optionally, the terminal can transmit information indicating a communication resource parameter and/or an artificial intelligence (AI) parameter (such as parameter information itself, or an indicator indicating a corresponding parameter information, etc.) to the network device. The network device can receive the information, and allocate a resource to the terminal according to the received information, thereby improving reliability of resource allocation.

For example, in some scenarios, the terminal may report periodically a channel quality indicator (CQI) to the network device. The terminal may transmit the CQI to the network device via a physical uplink control channel (PUCCH) or a physical uplink shared channel (PUSCH). Then the network device adjusts a modulation mode, a code rate, and a spectral efficiency for the terminal according to the reported CQI. The CQI reflects a channel quality of a physical downlink shared channel (PDSCH). For example, as shown in table 1, 0~15 represent the channel quality of the PDSCH, where 0 represents the lowest channel quality and 15 represents the highest channel quality. The terminal selects one CQI from the 16 CQIs according to a result of downlink channel estimation, and reports the CQI index to the network device. After taking various factors into consideration, such as resource allocation between multiple terminals, the network device assigns to the terminal resource parameters to-be-used, for example, a modulation mode, a code rate, and a spectral efficiency that will be actually used by the terminal as shown in table 2.

TABLE 1

| CQI index | Modulation mode | Code rate | Spectral efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |

TABLE 1-continued

| CQI index | Modulation mode | Code rate | Spectral efficiency |
|---|---|---|---|
| 14 | 64QAM | 873 | 5.1152 |
| 15 | 64QAM | 948 | 5.5547 |

TABLE 2

| Modulation and coding scheme (MCS) index | Modulation mode | Code rate | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

For another example, in some scenarios, the terminal can report to the network device a combination of present wireless channel condition and present AI parameter of the terminal, for example, report an indicator corresponding to the combination of present wireless channel condition and present AI parameter of the terminal, that is, the indicator indicates the combination of present wireless channel condition and present AI parameter of the terminal. As such, the network device can allocate resource according to the indicator, to allocate an optimal combination of wireless communication resource parameter and AI parameter to the terminal, thereby realizing an optimal match between wireless communication resource parameter and AI parameter configuration, and thus avoiding quality degradation of AI tasks and resource waste caused by mismatch between the two parameters.

Optionally, transmission of the indicator to the network device by the terminal may be triggered when the terminal needs to execute an AI task, or the terminal transmits the indicator to the network device periodically, etc. Implementations of the disclosure are not limited in this regard. For example, the terminal may transmit the indicator to the network device when the AI task is started. For another example, the terminal may transmit the indicator to the network device at a preset time interval.

The AI application over 5G system may be the following three major application scenarios: split AI operation over 5G system, AI model downloading over 5G system, and AI model training over 5G system.

For example, for split AI operation over 5G system, the terminal and the network device can cooperate to complete AI inference. The terminal mainly executes low-complexity computation that is delay-sensitive and privacy-sensitive, and the network device mainly executes high-complexity computation that is delay-insensitive and privacy-insensitive. In other words, the terminal first completes a part of the AI operation and reports intermediate data to the network device, and then the network device completes the remaining AI operation.

For example, for AI model downloading over 5G system, if the terminal has no needed model stored, the terminal may download from the network device the needed model for use.

For example, for AI model training over 5G system, distributed learning and federated learning over a mobile communication network are adopted for AI model training. During training, each of the terminals first performs training based on a global model provided by the mobile communication network, and then reports to the network device a gradient trained by the terminal. Then the network device aggregates local models from all the terminals to obtain an optimized global model.

Implementations of the disclosure provide a communication method and related devices, which are conducive to ensuring reliable resource allocation and will be respectively elaborated below.

Figure 2:
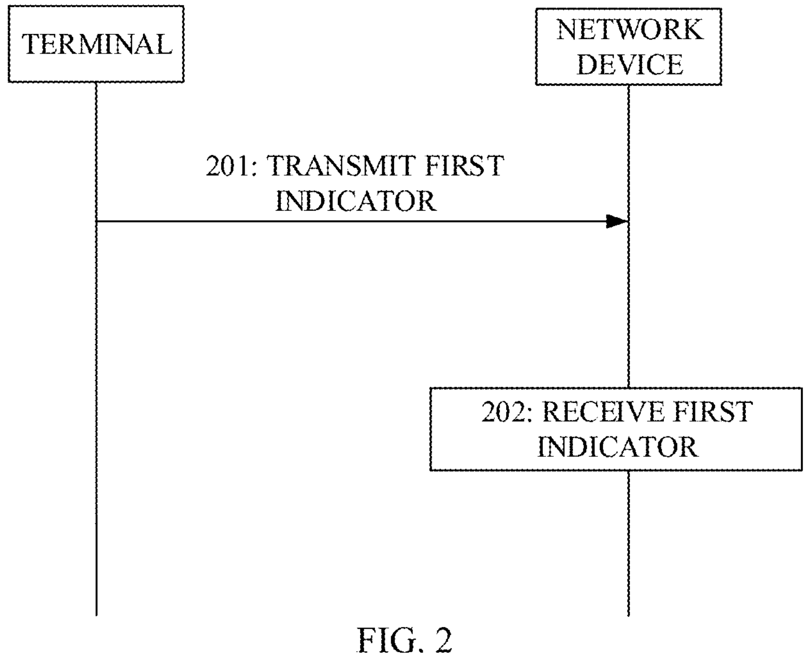
FIG. 2 is a schematic flowchart of a communication method provided in implementations of the disclosure.

Refer to FIG. 2, which is a schematic flowchart of a communication method provided in implementations of the disclosure. The method in this embodiment is applicable to the communication system described above. The method includes operations at 201 and 202.

201, a terminal transmits a first indicator to a network device.

Specifically, the terminal can transmit the first indicator to the network device. The first indicator identifies a first resource-parameter set, where the first resource-parameter set includes a first communication resource parameter and a first AI parameter, and the first indicator and the first resource-parameter set are in a first correspondence.

Optionally, the first communication resource parameter may represent a present wireless channel condition of the terminal, which may be specifically at least one of a modulation mode, a code rate, or a spectral efficiency. The first AI parameter may represent a parameter related to AI model execution by the terminal, which may be specifically at least one of a computational capability of the terminal to execute an AI operation, an AI model used by the terminal, a split point for the terminal to execute an AI model, AI operation steps of the terminal, a training-data size required for the terminal to complete one AI training, or a period for reporting a training result (hereinafter, "training-result reporting period" for short) by the terminal with an AI model. Optionally, the first indicator may be a numerical number, a bit value, or other indication information, and the disclosure is not limited in this regard.

In some possible implementations, the terminal may obtain the first resource-parameter set, for example, obtain the first communication resource parameter according to channel estimation on a present wireless channel and obtain the first AI parameter according to available computational resources of the terminal, hence determining the first indicator according to the first resource-parameter set. Optionally, the terminal may determine the first indicator according to the first resource-parameter set and the first correspondence, where the first correspondence is a correspondence between first indicators and first resource-parameter sets, and the first resource-parameter set may be the first communication resource parameter and the first AI parameter. Optionally, the first correspondence, that is, the correspondence between first indicators and first resource-parameter sets, may be defined via a table or in other manners. For example, table 3 is a table showing the correspondence between first indicators and first resource-parameter sets. In table 3, the first column represents the first indicator, and the last four columns represent the first resource-parameter set. As can be seen from the table, each first indicator has a corresponding first resource-parameter set. The first correspondence may be predefined, configured via system information, configured via radio resource control (RRC) signaling, or configured via a media access control-control element (MAC CE), and the disclosure is not limited in this regard.

In some possible implementations, the terminal may select a suitable combination of first communication resource parameter and first AI parameter according to channel estimation on a present wireless channel and available computational resources of the terminal, and transmit a corresponding first indicator to the network device. For example, the combination of first communication resource parameter and first AI parameter may be a combination of any one first communication resource parameter and any one first AI parameter, may be a combination of any one first communication resource parameter and any multiple first AI parameters, may be a combination of any multiple first communication resource parameters and any one first AI parameter, or may be a combination of any multiple first communication resource parameters and any multiple first AI parameters.

In some possible implementations, the correspondence between first indicators and first resource-parameter sets may be multiple. In this case, the terminal may determine the first correspondence from the multiple correspondences between first indicators and first resource-parameter sets according to a downlink control information (DCI) indication, a radio network temporary identity (RNTI), or a DCI format.

Exemplarily, the network device may transmit DCI indication information to the terminal, where the DCI indication information can indicate the correspondence between first indicators and first resource-parameter sets. The terminal can receive the DCI indication information transmitted by the network device, and then determine the first correspondence according to the DCI indication information.

Exemplarily, the terminal can determine the first correspondence according to RNTI information, where the RNTI information can indicate the correspondence between first indicators and first resource-parameter sets.

Exemplarily, the network device can transmit DCI format information to the terminal, where the DCI format information may be used for scheduling the correspondence between first indicators and first resource-parameter sets. The terminal can receive the DCI format information transmitted by the network device, and then determine the first correspondence according to the DCI format information.

Exemplarily, the correspondence between first indicators and first resource-parameter sets may be multiple, and the multiple correspondences each are represented via a table, such as table 3 and table 5. Compare the two tables, and it can be seen that the first four columns in each of table 3 and table 5 represent the first indicator, the modulation mode, the code rate, and the spectral efficiency respectively, whereas the fifth column in table 3 represents the computational capability of the terminal to execute an AI operation and the fifth column in table 5 represents the split point for the terminal to execute an AI model. According to a difference in the fifth column, that is, a difference in the first AI parameter, it is possible to determine a currently needed table (that is, a currently needed correspondence between first indicators and first resource-parameter sets) via the DCI indication, the RNTI, or the DCI format.

In some possible implementations, the terminal may transmit the first indicator to the network device via a PUCCH; or the terminal may transmit the first indicator to the network device via a PUSCH; or the terminal may transmit the first indicator to the network device via a MAC CE.

According to implementations of the disclosure, the terminal can report to the network device a present resource parameter of the terminal, where the resource parameter may be a combination of wireless channel condition and AI parameter. The terminal reports to the network device the present resource parameter of the terminal by transmitting the first indicator to the network device, where the first indicator indicates a combination of wireless channel condition and AI parameter of the terminal. As such, it is possible to provide to the network device an indicator that is associated with both present wireless channel condition and present AI parameter of the terminal, thereby ensuring reliability of resource allocation.

202, the network device receives the first indicator transmitted by terminal.

Specifically, after the terminal transmits the first indicator to the network device, the network device can receive the first indicator transmitted by terminal.

In some possible implementations, after the first indicator transmitted by the terminal is received by the network device, the network device can determine the first resource-parameter set of the terminal (that is, present wireless channel condition and present AI parameter of the terminal) according to the correspondence between first indicators and first resource-parameter sets.

In some possible implementations, the correspondence between first indicators and first resource-parameter sets may be multiple. In this case, the network device may determine the first correspondence from the multiple correspondences between first indicators and first resource-parameter sets according to a DCI indication, an RNTI, or a DCI format.

Exemplarily, the network device may determine the first correspondence according to DCI indication information, where the DCI indication information can indicate the correspondence between first indicators and first resource-parameter sets.

Exemplarily, the terminal may transmit RNTI information to the network device, where the RNTI information can indicate the correspondence between first indicators and first resource-parameter sets. The network device can receive the RNTI information transmitted by the terminal, and then determine the first correspondence according to the RNTI information.

Exemplarily, the network device may determine the first correspondence according to DCI format information, where the DCI format information can be used for scheduling the correspondence between first indicators and first resource-parameter sets.

It is to be noted that, DCI indications, RNTIs, or DCI formats used for the terminal and the network device to determine the first correspondence from the multiple correspondences between first indicators and first resource-parameter sets may be the same or different, and the disclosure is not limited in this regard.

In some possible implementations, the network device may receive via a PUCCH the first indicator transmitted by the terminal, or may receive via a PUSCH the first indicator transmitted by the terminal, or may receive via a MAC CE the first indicator transmitted by the terminal.

In implementations of the disclosure, the terminal transmits the first indicator to the network device, and the network device receives the first indicator transmitted by the terminal. The first indicator identifies the first resource-parameter set, where the first resource-parameter set includes the first communication resource parameter and the first AI parameter, and the first indicator and the first resource-parameter set are in the first correspondence. As such, the network device can provide an indicator that is associated with both present wireless channel condition and present AI parameter of the terminal, thereby ensuring reliability of resource allocation.

Figure 5:
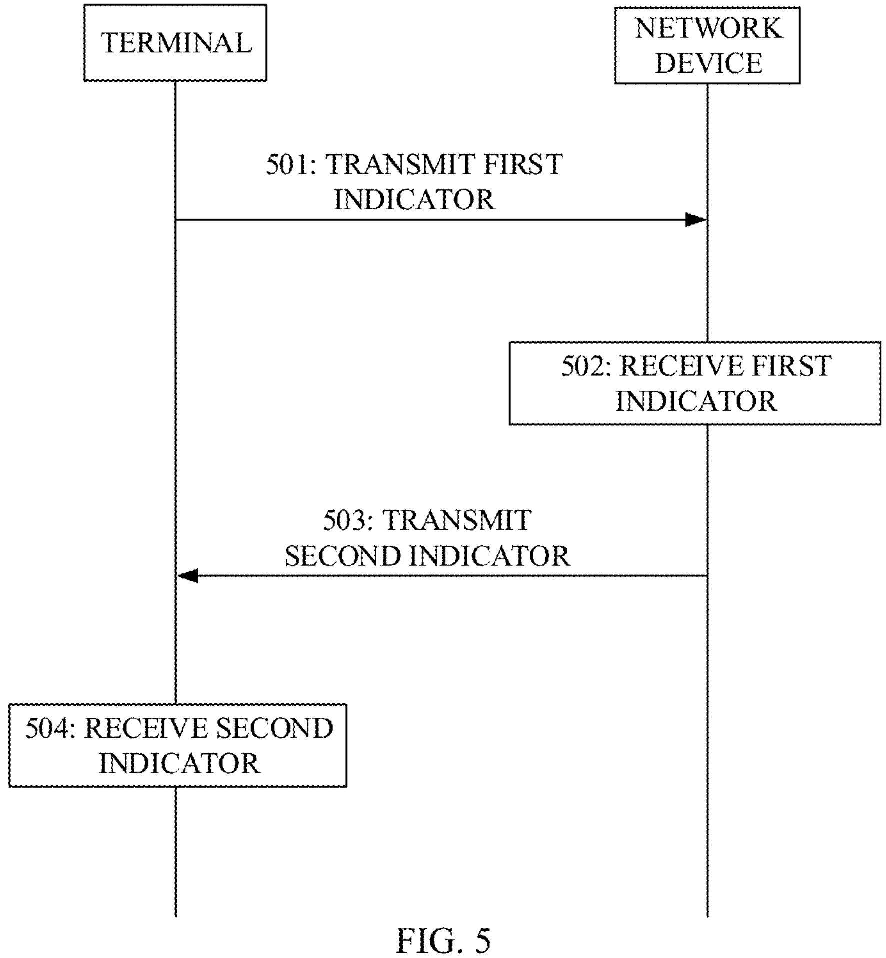
FIG. 5 is a schematic flowchart of another communication method provided in implementations of the disclosure.

Refer to FIG. 5, which is a schematic flowchart of another communication method provided in implementations of the disclosure. The method in this embodiment is applicable to the communication system described above. The method includes the following.

501, a terminal transmits a first indicator to a network device.

502, the network device receives the first indicator transmitted by the terminal.

For the implementation of steps 501~502, reference can be made to the related elaborations of steps 201~202 in the foregoing communication method, which will not be elaborated again herein.

503, the network device transmits a second indicator to the terminal.

Specifically, the network device may transmit the second indicator to the terminal. The second indicator identifies a second resource-parameter set, where the second resource-parameter set includes a second communication resource parameter and a second AI parameter, and the second indicator and the second resource-parameter set are in a second correspondence.

Optionally, the second communication resource parameter may represent a wireless channel resource scheduled by the network device for the terminal, which may be specifically at least one of a modulation mode, a code rate, or a spectral efficiency. The second AI parameter may represent a parameter related to AI model execution by the terminal scheduled by the network device for the terminal, which may be specifically at least one of a computational capability of the terminal to execute an AI operation, an AI model used by the terminal, a split point for the terminal to execute an AI model, AI operation steps of the terminal, a training-data size required for the terminal to complete one AI training, or a training-result reporting period of the terminal with an AI model. Optionally, the second indicator may be a numerical number, a bit value, or other indication information, and the disclosure is not limited in this regard.

In some possible implementations, the network device may determine a present first resource-parameter set of the terminal according to the first indicator transmitted by the terminal, and then determine, according to the first resource-parameter set, the second resource-parameter set that is suitable for the terminal. Optionally, the network device may determine the second indicator according to the second resource-parameter set and the second correspondence. The second correspondence may be a correspondence between second indicators and second resource-parameter sets. The second resource-parameter set may be the second communication resource parameter and the second AI parameter. Optionally, the second correspondence, that is, the correspondence between second indicators and second resource-parameter sets, may be defined via a table or in other manners. For example, table 4 is a table showing the correspondence between second indicators and second resource-parameter sets. In table 4, the first column represents the second indicator, and the last four columns represent the second resource-parameter set. As can be seen from the table, each second indicator has a corresponding second resource-parameter set. The second correspondence may be predefined, configured via system information, configured via RRC signaling, or configured via a MAC CE, and the disclosure is not limited in this regard.

In some possible implementations, the correspondence between second indicators and second resource-parameter sets may be multiple. In this case, the network device may determine the second correspondence from the multiple correspondences between second indicators and second resource-parameter sets according to a DCI indication, an RNTI, or a DCI format.

Exemplarily, the network device may determine the second correspondence according to DCI indication information, where the DCI indication information can indicate the correspondence between second indicators and second resource-parameter sets.

Exemplarily, the terminal may transmit RNTI information to the network device, where the RNTI information can indicate the correspondence between second indicators and second resource-parameter sets. The network device can receive the RNTI information transmitted by the terminal, thereby determining the second correspondence according to the RNTI information.

Exemplarily, the network device may determine the second correspondence according to DCI format information, where the DCI format information can be used for scheduling the correspondence between second indicators and second resource-parameter sets.

Exemplarily, the correspondence between second indicators and second resource-parameter sets may be multiple, and the multiple correspondences each are represented via a table, such as table 4 and table 6. Compare the two tables, and it can be seen that the first four columns in each of table 4 and table 6 represent the second indicator, the modulation mode, the code rate, and the spectral efficiency respectively, whereas the fifth column in table 4 represents the computational capability of the terminal to execute an AI operation and the fifth column in table 6 represents the split point for the terminal to execute AI model. According to a difference in the fifth column, that is, a difference in the second AI parameter, it is possible to determine a currently needed table (that is, a currently needed correspondence between second indicators and second resource-parameter sets) via the DCI indication, the RNTI, or the DCI format.

In some possible implementations, the network device may transmit the second indicator to the terminal via a physical downlink control channel (PDCCH), or may transmit the second indicator to the terminal via a PDSCH, or may transmit the second indicator to the terminal via a MAC CE.

504, the terminal receives the second indicator transmitted by the network device.

Specifically, after the network device transmits the second indicator to the terminal, the terminal can receive the second indicator transmitted by the network device, and determine the second resource-parameter set of the terminal according to the correspondence between second indicators and second resource-parameter sets. In other words, the terminal can use the second communication resource parameter and the second AI parameter scheduled by the network device.

In some possible implementations, the correspondence between second indicators and second resource-parameter sets may be multiple. In this case, the terminal can determine the second correspondence from the multiple correspondences between second indicators and second resource-parameter sets according to an DCI indication, an RNTI, or a DCI format.

Exemplarily, the network device may transmit DCI indication information to the terminal, where the DCI indication information can indicate the correspondence between second indicators and second resource-parameter sets. The terminal can receive the DCI indication information transmitted by the network device, thereby determining the second correspondence according to the DCI indication information.

Exemplarily, the terminal may determine the second correspondence according to RNTI information, where the RNTI information can indicate the correspondence between second indicators and second resource-parameter sets.

Exemplarily, the network device may transmit DCI format information to the terminal, where the DCI format information can be used for scheduling the correspondence between second indicators and second resource-parameter sets. The terminal can receive the DCI format information transmitted by the network device, thereby determining the second correspondence according to the DCI format information.

It is to be noted that, DCI indications, RNTIs, or DCI formats used for the terminal and the network device to determine the second correspondence from the multiple correspondences between second indicators and second resource-parameter sets may be the same or different, and the disclosure is not limited in this regard.

Exemplarily, the first AI parameter is the computational capability of the terminal to execute an AI operation. An available computational capability of the terminal will affect transmission quality regarding an AI task between the terminal and the network device. In order to ensure that the terminal can use a wireless communication resource configuration and an AI parameter configuration to execute an AI task, the terminal may report a present wireless channel condition and a present available computational capability to the network device, for example, as shown in table 3. Table 3 shows a correspondence between first indicators and first resource-parameter sets, where the first resource-parameter set includes the modulation mode, the code rate, and the spectral efficiency among the first communication resource parameter and the computational capability of the terminal to execute an AI operation among the first AI parameter. The computational capability may include several levels based on a pre-agreed rule, where each level corresponds to a certain computation capability. For example, the computational capability of the terminal shown in table 3 includes two levels: level 1 and level 2. Different first indicators in table 3 may be mapped onto level 1 or level 2. Specifically, according to channel estimation on a present wireless channel and available computational resources of the terminal, the terminal may select from table 3 a suitable modulation mode, code rate, spectral efficiency, and available computational capability, and then transmit a corresponding first indicator to the network device. In addition, the network device can know a present first communication resource parameter of the terminal and a present computational capability of the terminal to execute an AI operation according to the first indicator transmitted by the terminal. Then the network device determines an optimal second communication resource parameter and computational capability of the terminal to execute an AI operation according to the first communication resource parameter and the computational capability of the terminal to execute an AI operation, and transmits to the terminal a second indicator corresponding to the second communication resource parameter and the computational capability of the terminal to execute an AI operation. After receiving the second indicator, the terminal can use the second communication resource parameter and the available computational capability scheduled by the network device, to complete an AI task, for example, as shown in table 4. Table 4 shows a correspondence between second indicators and second resource-parameter sets, where the second resource-parameter set includes the modulation mode, the code rate, and the spectral efficiency among the second communication resource parameter and the computational capability of the terminal to execute an AI operation among the second AI parameter. After determining the optimal second communication resource parameter and computational capability of the terminal to execute an AI operation, the network device can determine the corresponding second indicator according to table 4.

TABLE 3

| First indicator | Modulation mode | Code rate | Spectral efficiency | computational capability |
|---|---|---|---|---|
| 0 | QPSK | Rate 0 | Efficiency 0 | Level 1 |
| 1 | QPSK | Rate 1 | Efficiency 1 | Level 1 |
| 2 | QPSK | Rate 2 | Efficiency 2 | Level 1 |
| 3 | QPSK | Rate 3 | Efficiency 3 | Level 1 |
| 4 | QPSK | Rate 4 | Efficiency 4 | Level 1 |
| 5 | QPSK | Rate 5 | Efficiency 5 | Level 1 |
| 6 | QPSK | Rate 6 | Efficiency 6 | Level 1 |
| 7 | 16QAM | Rate 7 | Efficiency 7 | Level 1 |
| 8 | 16QAM | Rate 8 | Efficiency 8 | Level 1 |
| 9 | 16QAM | Rate 9 | Efficiency 9 | Level 1 |
| 10 | 64QAM | Rate 10 | Efficiency 10 | Level 1 |
| 11 | 64QAM | Rate 11 | Efficiency 11 | Level 1 |
| 12 | 64QAM | Rate 12 | Efficiency 12 | Level 1 |
| 13 | 64QAM | Rate 13 | Efficiency 13 | Level 1 |
| 14 | 64QAM | Rate 14 | Efficiency 14 | Level 1 |
| 15 | 64QAM | Rate 15 | Efficiency 15 | Level 1 |
| 16 | QPSK | Rate 0 | Efficiency 0 | Level 2 |
| 17 | QPSK | Rate 1 | Efficiency 1 | Level 2 |
| 18 | QPSK | Rate 2 | Efficiency 2 | Level 2 |
| 19 | QPSK | Rate 3 | Efficiency 3 | Level 2 |
| 20 | QPSK | Rate 4 | Efficiency 4 | Level 2 |
| 21 | QPSK | Rate 5 | Efficiency 5 | Level 2 |
| 22 | QPSK | Rate 6 | Efficiency 6 | Level 2 |
| 23 | 16QAM | Rate 7 | Efficiency 7 | Level 2 |
| 24 | 16QAM | Rate 8 | Efficiency 8 | Level 2 |
| 25 | 16QAM | Rate 9 | Efficiency 9 | Level 2 |
| 26 | 64QAM | Rate 10 | Efficiency 10 | Level 2 |
| 27 | 64QAM | Rate 11 | Efficiency 11 | Level 2 |
| 28 | 64QAM | Rate 12 | Efficiency 12 | Level 2 |
| 29 | 64QAM | Rate 13 | Efficiency 13 | Level 2 |
| 30 | 64QAM | Rate 14 | Efficiency 14 | Level 2 |
| 31 | 64QAM | Rate 15 | Efficiency 15 | Level 2 |

TABLE 4

| Second indicator | Modulation mode | Code rate | Spectral efficiency | computational capability |
|---|---|---|---|---|
| 0 | 2 | Rate 0 | Efficiency 0 | Level 1 |
| 1 | 2 | Rate 1 | Efficiency 1 | Level 1 |
| 2 | 2 | Rate 2 | Efficiency 2 | Level 1 |
| 3 | 2 | Rate 3 | Efficiency 3 | Level 1 |
| 4 | 2 | Rate 4 | Efficiency 4 | Level 1 |
| 5 | 2 | Rate 5 | Efficiency 5 | Level 1 |
| 6 | 2 | Rate 6 | Efficiency 6 | Level 1 |
| 7 | 4 | Rate 7 | Efficiency 7 | Level 1 |
| 8 | 4 | Rate 8 | Efficiency 8 | Level 1 |
| 9 | 4 | Rate 9 | Efficiency 9 | Level 1 |
| 10 | 6 | Rate 10 | Efficiency 10 | Level 1 |
| 11 | 6 | Rate 11 | Efficiency 11 | Level 1 |
| 12 | 6 | Rate 12 | Efficiency 12 | Level 1 |
| 13 | 6 | Rate 13 | Efficiency 13 | Level 1 |
| 14 | 6 | Rate 14 | Efficiency 14 | Level 1 |
| 15 | 6 | Rate 15 | Efficiency 15 | Level 1 |
| 16 | 2 | Rate 0 | Efficiency 0 | Level 2 |
| 17 | 2 | Rate 1 | Efficiency 1 | Level 2 |
| 18 | 2 | Rate 2 | Efficiency 2 | Level 2 |
| 19 | 2 | Rate 3 | Efficiency 3 | Level 2 |
| 20 | 2 | Rate 4 | Efficiency 4 | Level 2 |
| 21 | 2 | Rate 5 | Efficiency 5 | Level 2 |
| 22 | 2 | Rate 6 | Efficiency 6 | Level 2 |
| 23 | 4 | Rate 7 | Efficiency 7 | Level 2 |
| 24 | 4 | Rate 8 | Efficiency 8 | Level 2 |
| 25 | 4 | Rate 9 | Efficiency 9 | Level 2 |
| 26 | 6 | Rate 10 | Efficiency 10 | Level 2 |
| 27 | 6 | Rate 11 | Efficiency 11 | Level 2 |
| 28 | 6 | Rate 12 | Efficiency 12 | Level 2 |
| 29 | 6 | Rate 13 | Efficiency 13 | Level 2 |
| 30 | 6 | Rate 14 | Efficiency 14 | Level 2 |
| 31 | 6 | Rate 15 | Efficiency 15 | Level 2 |

It is to be noted that, table 3 and table 4 have no one-to-one correspondence, such as the second line in table 3 and the second line in table 4. Table 3 and table 4 are representations of the first correspondence and the second correspondence respectively, and the same also applies to the tables below.

Figure 3A:
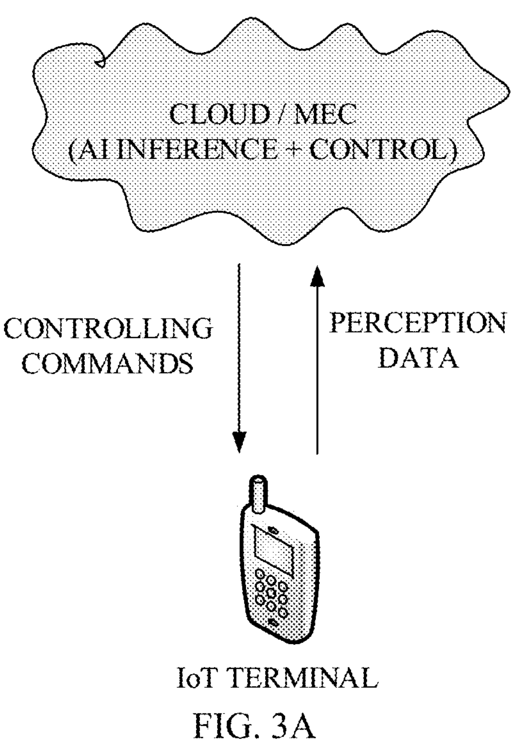
FIG. 3A is a schematic structural diagram illustrating artificial intelligence (AI) operation offloading provided in implementations of the disclosure.
Figure 3B:
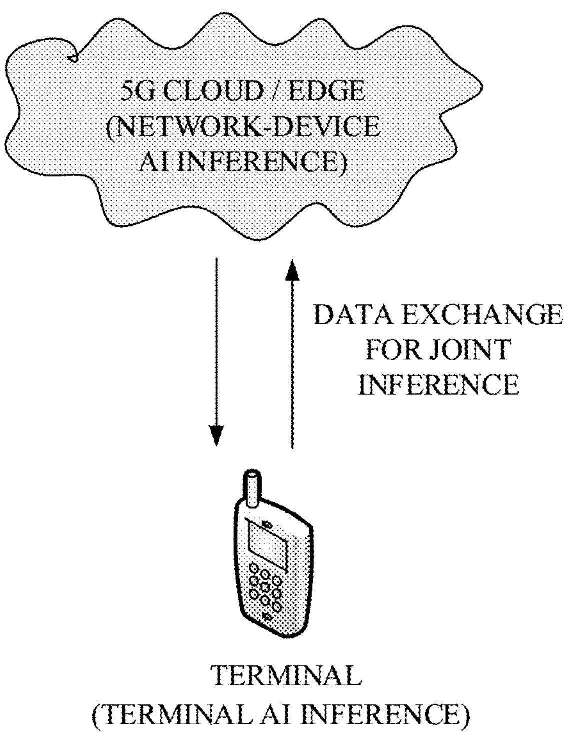
FIG. 3B is a schematic structural diagram illustrating AI operation splitting provided in implementations of the disclosure.
Figure 4:
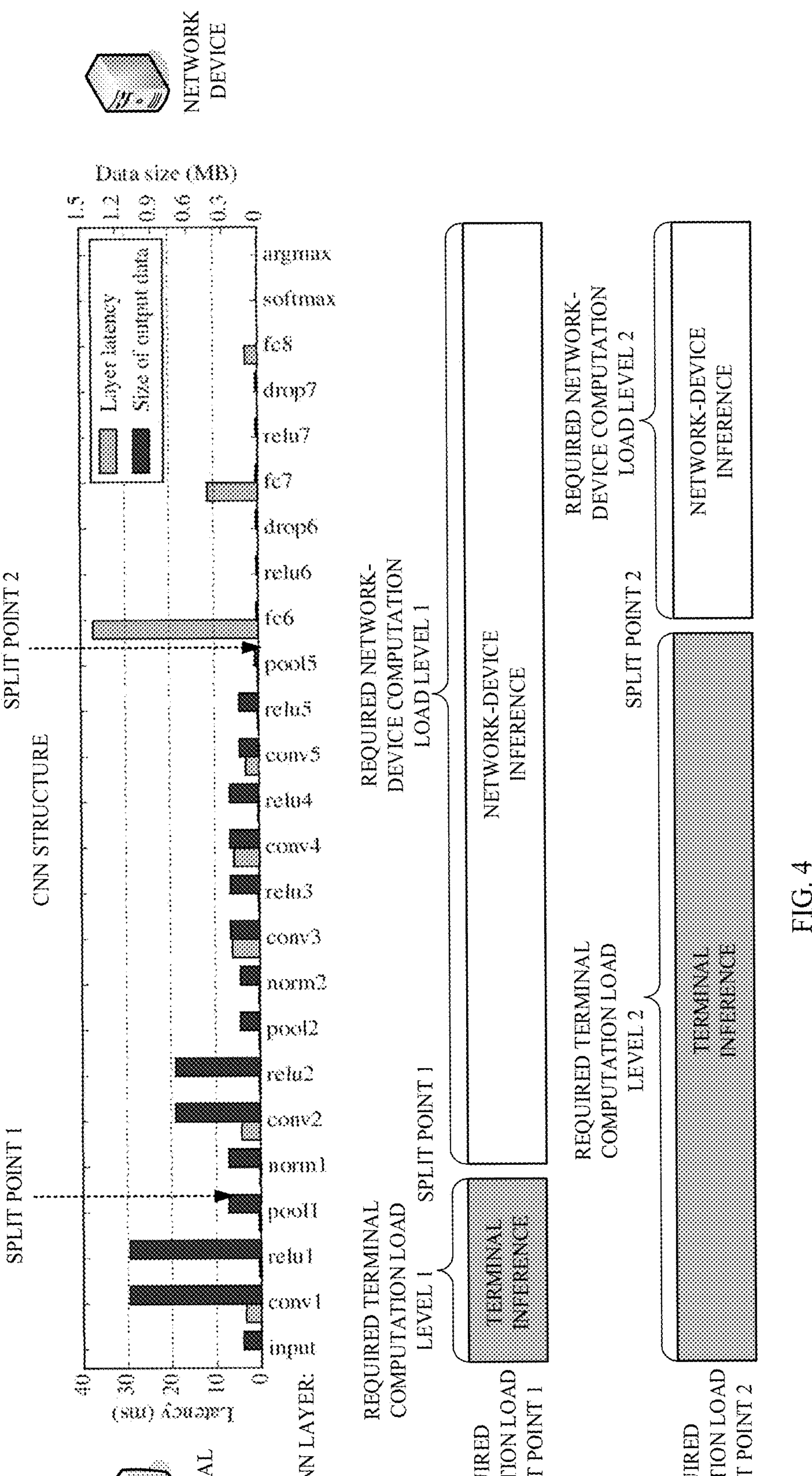
FIG. 4 is a structural diagram illustrating a difference between different split points in terms of required terminal computation load and available terminal computational capability provided in implementations of the disclosure.

Exemplarily, the first AI parameter is the split point for the terminal to execute an AI model. The terminal executes low-complexity computation that is delay-sensitive and privacy-sensitive, and the network device executes high-complexity computation that is delay-insensitive and privacy-insensitive, as illustrated in FIG. 3A and FIG. 3B. FIG. 4 illustrates a typical convolutional neural network (CNN) structure. As can be seen from FIG. 4, there are some candidate split points in a CNN. The terminal executes computation of some layers only (a computation load is computation load level 1 or computation load level 2) up to the split point, and then transmits an intermediate data size to the network device, such that the network device executes computation of the remaining layers. In addition, it can be seen that a required computation load for the terminal for split point 2 is larger than that for split point 1, and an intermediate data size that requires to be uploaded by the terminal for split point 1 is significantly larger than that for split point 2. Therefore, selection of the split point will affect a wireless communication resource that needs to be allocated to the terminal by the network device. In order to ensure that the terminal can use a wireless communication resource configuration and an AI parameter configuration to execute an AI task, the terminal may report a present wireless channel condition and a present split point to the network device, for example, as shown in table 5. Table 5 shows a correspondence between first indicators and first resource-parameter sets, where the first resource-parameter set includes the modulation mode, the code rate, and the spectral efficiency among the first communication resource parameter and the split point for the terminal to execute an AI model among the first AI parameter. For example, as shown in table 5, the split point to execute an AI model has two options: split point 1 or split point 2. Specifically, according to channel estimation on a present wireless channel and available computational resources of the terminal, the terminal may select from table 5 a suitable modulation mode, code rate, spectral efficiency, and split point, and then transmit a corresponding first indicator to the network device. In addition, the network device can know a present first communication resource parameter of the terminal and the present split point for the terminal to execute an AI model according to the first indicator transmitted by the terminal. Then the network device determines an optimal second communication resource parameter and split point for the terminal to execute an AI model according to the first communication resource parameter and the split point for the terminal to execute AI model, and then transmits to the terminal a second indicator corresponding to the second communication resource parameter and the split point for the terminal to execute an AI model. After receiving the second indicator, the terminal can use the second communication resource parameter and the split point for the terminal to execute an AI model scheduled by the network device, to complete an AI task, for example, as shown in table 6. Table 6 shows a correspondence between second indicators and second resource-parameter sets, where the second resource-parameter set includes the modulation mode, the code rate, and the spectral efficiency among the second communication resource parameter and the split point for the terminal to execute an AI model among the second AI parameter. After determining the optimal second communication resource parameter and split point for the terminal to execute an AI model, the network device can determine the corresponding second indicator according to table 6.

TABLE 5

| First indicator | Modulation mode | Code rate | Spectral efficiency | Split point |
|---|---|---|---|---|
| 0 | QPSK | Rate 0 | Efficiency 0 | Split point 1 |
| 1 | QPSK | Rate 1 | Efficiency 1 | Split point 1 |
| 2 | QPSK | Rate 2 | Efficiency 2 | Split point 1 |
| 3 | QPSK | Rate 3 | Efficiency 3 | Split point 1 |
| 4 | QPSK | Rate 4 | Efficiency 4 | Split point 1 |
| 5 | QPSK | Rate 5 | Efficiency 5 | Split point 1 |
| 6 | QPSK | Rate 6 | Efficiency 6 | Split point 1 |
| 7 | 16QAM | Rate 7 | Efficiency 7 | Split point 1 |
| 8 | 16QAM | Rate 8 | Efficiency 8 | Split point 1 |
| 9 | 16QAM | Rate 9 | Efficiency 9 | Split point 1 |
| 10 | 64QAM | Rate 10 | Efficiency 10 | Split point 1 |
| 11 | 64QAM | Rate 11 | Efficiency 11 | Split point 1 |
| 12 | 64QAM | Rate 12 | Efficiency 12 | Split point 1 |
| 13 | 64QAM | Rate 13 | Efficiency 13 | Split point 1 |
| 14 | 64QAM | Rate 14 | Efficiency 14 | Split point 1 |
| 15 | 64QAM | Rate 15 | Efficiency 15 | Split point 1 |
| 16 | QPSK | Rate 0 | Efficiency 0 | Split point 2 |
| 17 | QPSK | Rate 1 | Efficiency 1 | Split point 2 |
| 18 | QPSK | Rate 2 | Efficiency 2 | Split point 2 |
| 19 | QPSK | Rate 3 | Efficiency 3 | Split point 2 |
| 20 | QPSK | Rate 4 | Efficiency 4 | Split point 2 |
| 21 | QPSK | Rate 5 | Efficiency 5 | Split point 2 |
| 22 | QPSK | Rate 6 | Efficiency 6 | Split point 2 |
| 23 | 16QAM | Rate 7 | Efficiency 7 | Split point 2 |
| 24 | 16QAM | Rate 8 | Efficiency 8 | Split point 2 |
| 25 | 16QAM | Rate 9 | Efficiency 9 | Split point 2 |
| 26 | 64QAM | Rate 10 | Efficiency 10 | Split point 2 |
| 27 | 64QAM | Rate 11 | Efficiency 11 | Split point 2 |
| 28 | 64QAM | Rate 12 | Efficiency 12 | Split point 2 |
| 29 | 64QAM | Rate 13 | Efficiency 13 | Split point 2 |
| 30 | 64QAM | Rate 14 | Efficiency 14 | Split point 2 |
| 31 | 64QAM | Rate 15 | Efficiency 15 | Split point 2 |

TABLE 6

| Second indicator | Modulation mode | Code rate | Spectral efficiency | Split point |
|---|---|---|---|---|
| 0 | 2 | Rate 0 | Efficiency 0 | Split point 1 |
| 1 | 2 | Rate 1 | Efficiency 1 | Split point 1 |
| 2 | 2 | Rate 2 | Efficiency 2 | Split point 1 |
| 3 | 2 | Rate 3 | Efficiency 3 | Split point 1 |
| 4 | 2 | Rate 4 | Efficiency 4 | Split point 1 |
| 5 | 2 | Rate 5 | Efficiency 5 | Split point 1 |
| 6 | 2 | Rate 6 | Efficiency 6 | Split point 1 |
| 7 | 4 | Rate 7 | Efficiency 7 | Split point 1 |
| 8 | 4 | Rate 8 | Efficiency 8 | Split point 1 |
| 9 | 4 | Rate 9 | Efficiency 9 | Split point 1 |
| 10 | 6 | Rate 10 | Efficiency 10 | Split point 1 |
| 11 | 6 | Rate 11 | Efficiency 11 | Split point 1 |
| 12 | 6 | Rate 12 | Efficiency 12 | Split point 1 |
| 13 | 6 | Rate 13 | Efficiency 13 | Split point 1 |
| 14 | 6 | Rate 14 | Efficiency 14 | Split point 1 |
| 15 | 6 | Rate 15 | Efficiency 15 | Split point 1 |
| 16 | 2 | Rate 0 | Efficiency 0 | Split point 2 |
| 17 | 2 | Rate 1 | Efficiency 1 | Split point 2 |
| 18 | 2 | Rate 2 | Efficiency 2 | Split point 2 |
| 19 | 2 | Rate 3 | Efficiency 3 | Split point 2 |
| 20 | 2 | Rate 4 | Efficiency 4 | Split point 2 |
| 21 | 2 | Rate 5 | Efficiency 5 | Split point 2 |
| 22 | 2 | Rate 6 | Efficiency 6 | Split point 2 |
| 23 | 4 | Rate 7 | Efficiency 7 | Split point 2 |
| 24 | 4 | Rate 8 | Efficiency 8 | Split point 2 |
| 25 | 4 | Rate 9 | Efficiency 9 | Split point 2 |
| 26 | 6 | Rate 10 | Efficiency 10 | Split point 2 |
| 27 | 6 | Rate 11 | Efficiency 11 | Split point 2 |
| 28 | 6 | Rate 12 | Efficiency 12 | Split point 2 |
| 29 | 6 | Rate 13 | Efficiency 13 | Split point 2 |
| 30 | 6 | Rate 14 | Efficiency 14 | Split point 2 |
| 31 | 6 | Rate 15 | Efficiency 15 | Split point 2 |

Exemplarily, the first AI parameter is AI operation steps of the terminal. An AI operation splitting mode may be to split different steps or different parts of an AI procedure to the terminal and the network device for operation. Intermediate data sizes outputted through different splitting modes are also significantly different, for example, as shown in table 7. Table 7 shows a correspondence between first indicators and first resource-parameter sets, where the first resource-parameter set is a combination of the modulation mode, the code rate, and the spectral efficiency among the first communication resource parameter and the AI operation steps of the terminal among the first AI parameter. For example, the AI operation steps of the terminal shown in table 7 have two options: steps 1~2 and steps 1~4. Specifically, according to channel estimation on a present wireless channel and available computational resources of the terminal, the terminal may select from table 7 a suitable modulation mode, code rate, spectral efficiency, and steps, and transmit a corresponding first indicator to the network device. In addition, the network device determines, according to the first indicator reported by the terminal, a second communication resource parameter and AI operation steps of the terminal that are suitable for the terminal, and transmits a corresponding second indicator to the terminal, as shown in table 8.After receiving the second indicator, the terminal can use the second communication resource parameter and the AI operation steps of the terminal scheduled by the network device, to complete an AI task.

TABLE 7

| First indicator | Modulation mode | Code rate | Spectral efficiency | Steps |
|---|---|---|---|---|
| 0 | QPSK | Rate 0 | Efficiency 0 | Steps 1~2 |
| 1 | QPSK | Rate 1 | Efficiency 1 | Steps 1~2 |
| 2 | QPSK | Rate 2 | Efficiency 2 | Steps 1~2 |
| 3 | QPSK | Rate 3 | Efficiency 3 | Steps 1~2 |

TABLE 7-continued

| First indicator | Modulation mode | Code rate | Spectral efficiency | Steps |
|---|---|---|---|---|
| 4 | QPSK | Rate 4 | Efficiency 4 | Steps 1~2 |
| 5 | QPSK | Rate 5 | Efficiency 5 | Steps 1~2 |
| 6 | QPSK | Rate 6 | Efficiency 6 | Steps 1~2 |
| 7 | 16QAM | Rate 7 | Efficiency 7 | Steps 1~2 |
| 8 | 16QAM | Rate 8 | Efficiency 8 | Steps 1~2 |
| 9 | 16QAM | Rate 9 | Efficiency 9 | Steps 1~2 |
| 10 | 64QAM | Rate 10 | Efficiency 10 | Steps 1~2 |
| 11 | 64QAM | Rate 11 | Efficiency 11 | Steps 1~2 |
| 12 | 64QAM | Rate 12 | Efficiency 12 | Steps 1~2 |
| 13 | 64QAM | Rate 13 | Efficiency 13 | Steps 1~2 |
| 14 | 64QAM | Rate 14 | Efficiency 14 | Steps 1~2 |
| 15 | 64QAM | Rate 15 | Efficiency 15 | Steps 1~2 |
| 16 | QPSK | Rate 0 | Efficiency 0 | Steps 1~4 |
| 17 | QPSK | Rate 1 | Efficiency 1 | Steps 1~4 |
| 18 | QPSK | Rate 2 | Efficiency 2 | Steps 1~4 |
| 19 | QPSK | Rate 3 | Efficiency 3 | Steps 1~4 |
| 20 | QPSK | Rate 4 | Efficiency 4 | Steps 1~4 |
| 21 | QPSK | Rate 5 | Efficiency 5 | Steps 1~4 |
| 22 | QPSK | Rate 6 | Efficiency 6 | Steps 1~4 |
| 23 | 16QAM | Rate 7 | Efficiency 7 | Steps 1~4 |
| 24 | 16QAM | Rate 8 | Efficiency 8 | Steps 1~4 |
| 25 | 16QAM | Rate 9 | Efficiency 9 | Steps 1~4 |
| 26 | 64QAM | Rate 10 | Efficiency 10 | Steps 1~4 |
| 27 | 64QAM | Rate 11 | Efficiency 11 | Steps 1~4 |
| 28 | 64QAM | Rate 12 | Efficiency 12 | Steps 1~4 |
| 29 | 64QAM | Rate 13 | Efficiency 13 | Steps 1~4 |
| 30 | 64QAM | Rate 14 | Efficiency 14 | Steps 1~4 |
| 31 | 64QAM | Rate 15 | Efficiency 15 | Steps 1~4 |

TABLE 8

| Second indicator | Modulation mode | Code rate | Spectral efficiency | Steps |
|---|---|---|---|---|
| 0 | 2 | Rate 0 | Efficiency 0 | Steps 1~2 |
| 1 | 2 | Rate 1 | Efficiency 1 | Steps 1~2 |
| 2 | 2 | Rate 2 | Efficiency 2 | Steps 1~2 |
| 3 | 2 | Rate 3 | Efficiency 3 | Steps 1~2 |
| 4 | 2 | Rate 4 | Efficiency 4 | Steps 1~2 |
| 5 | 2 | Rate 5 | Efficiency 5 | Steps 1~2 |
| 6 | 2 | Rate 6 | Efficiency 6 | Steps 1~2 |
| 7 | 4 | Rate 7 | Efficiency 7 | Steps 1~2 |
| 8 | 4 | Rate 8 | Efficiency 8 | Steps 1~2 |
| 9 | 4 | Rate 9 | Efficiency 9 | Steps 1~2 |
| 10 | 6 | Rate 10 | Efficiency 10 | Steps 1~2 |
| 11 | 6 | Rate 11 | Efficiency 11 | Steps 1~2 |
| 12 | 6 | Rate 12 | Efficiency 12 | Steps 1~2 |
| 13 | 6 | Rate 13 | Efficiency 13 | Steps 1~2 |
| 14 | 6 | Rate 14 | Efficiency 14 | Steps 1~2 |
| 15 | 6 | Rate 15 | Efficiency 15 | Steps 1~2 |
| 16 | 2 | Rate 0 | Efficiency 0 | Steps 1~4 |
| 17 | 2 | Rate 1 | Efficiency 1 | Steps 1~4 |
| 18 | 2 | Rate 2 | Efficiency 2 | Steps 1~4 |
| 19 | 2 | Rate 3 | Efficiency 3 | Steps 1~4 |
| 20 | 2 | Rate 4 | Efficiency 4 | Steps 1~4 |
| 21 | 2 | Rate 5 | Efficiency 5 | Steps 1~4 |
| 22 | 2 | Rate 6 | Efficiency 6 | Steps 1~4 |
| 23 | 4 | Rate 7 | Efficiency 7 | Steps 1~4 |
| 24 | 4 | Rate 8 | Efficiency 8 | Steps 1~4 |
| 25 | 4 | Rate 9 | Efficiency 9 | Steps 1~4 |
| 26 | 6 | Rate 10 | Efficiency 10 | Steps 1~4 |
| 27 | 6 | Rate 11 | Efficiency 11 | Steps 1~4 |
| 28 | 6 | Rate 12 | Efficiency 12 | Steps 1~4 |
| 29 | 6 | Rate 13 | Efficiency 13 | Steps 1~4 |
| 30 | 6 | Rate 14 | Efficiency 14 | Steps 1~4 |
| 31 | 6 | Rate 15 | Efficiency 15 | Steps 1~4 |

Exemplarily, the first AI parameter is the AI model used by the terminal, for example, as shown in table 9. Table 9 shows a correspondence between first indicators and first resource-parameter sets, where the first resource-parameter set is a combination of the modulation mode, the code rate, and the spectral efficiency among the first communication resource parameter and the AI model used by the terminal among the first AI parameter. For example, as shown in table 9, an AI model available for the terminal includes two types: Model #1 and Model #2. Specifically, according to channel estimation on a present wireless channel and available computational resources of the terminal, the terminal can select from table 9 a suitable modulation mode, code rate, and spectral efficiency and an AI model suitable for the terminal to use, and transmit a corresponding first indicator to the network device. In addition, the network device determines, according to the first indicator reported by the terminal, a second communication resource parameter and an AI model used by the terminal that are suitable for the terminal, and transmits a corresponding second indicator to the terminal, as shown in table 10. After receiving the second indicator, the terminal can use the second communication resource parameter and the AI model scheduled by the network device, to complete an AI task.

TABLE 9

| First indicator | Modulation mode | Code rate | Spectral efficiency | Model |
|---|---|---|---|---|
| 0 | QPSK | Rate 0 | Efficiency 0 | Model #1 |
| 1 | QPSK | Rate 1 | Efficiency 1 | Model #1 |
| 2 | QPSK | Rate 2 | Efficiency 2 | Model #1 |
| 3 | QPSK | Rate 3 | Efficiency 3 | Model #1 |
| 4 | QPSK | Rate 4 | Efficiency 4 | Model #1 |
| 5 | QPSK | Rate 5 | Efficiency 5 | Model #1 |
| 6 | QPSK | Rate 6 | Efficiency 6 | Model #1 |
| 7 | 16QAM | Rate 7 | Efficiency 7 | Model #1 |
| 8 | 16QAM | Rate 8 | Efficiency 8 | Model #1 |
| 9 | 16QAM | Rate 9 | Efficiency 9 | Model #1 |
| 10 | 64QAM | Rate 10 | Efficiency 10 | Model #1 |
| 11 | 64QAM | Rate 11 | Efficiency 11 | Model #1 |
| 12 | 64QAM | Rate 12 | Efficiency 12 | Model #1 |
| 13 | 64QAM | Rate 13 | Efficiency 13 | Model #1 |
| 14 | 64QAM | Rate 14 | Efficiency 14 | Model #1 |
| 15 | 64QAM | Rate 15 | Efficiency 15 | Model #1 |
| 16 | QPSK | Rate 0 | Efficiency 0 | Model #2 |
| 17 | QPSK | Rate 1 | Efficiency 1 | Model #2 |
| 18 | QPSK | Rate 2 | Efficiency 2 | Model #2 |
| 19 | QPSK | Rate 3 | Efficiency 3 | Model #2 |
| 20 | QPSK | Rate 4 | Efficiency 4 | Model #2 |
| 21 | QPSK | Rate 5 | Efficiency 5 | Model #2 |
| 22 | QPSK | Rate 6 | Efficiency 6 | Model #2 |
| 23 | 16QAM | Rate 7 | Efficiency 7 | Model #2 |
| 24 | 16QAM | Rate 8 | Efficiency 8 | Model #2 |
| 25 | 16QAM | Rate 9 | Efficiency 9 | Model #2 |
| 26 | 64QAM | Rate 10 | Efficiency 10 | Model #2 |
| 27 | 64QAM | Rate 11 | Efficiency 11 | Model #2 |
| 28 | 64QAM | Rate 12 | Efficiency 12 | Model #2 |
| 29 | 64QAM | Rate 13 | Efficiency 13 | Model #2 |
| 30 | 64QAM | Rate 14 | Efficiency 14 | Model #2 |
| 31 | 64QAM | Rate 15 | Efficiency 15 | Model #2 |

TABLE 10

| Second indicator | Modulation mode | Code rate | Spectral efficiency | Model |
|---|---|---|---|---|
| 0 | 2 | Rate 0 | Efficiency 0 | Model #1 |
| 1 | 2 | Rate 1 | Efficiency 1 | Model #1 |
| 2 | 2 | Rate 2 | Efficiency 2 | Model #1 |
| 3 | 2 | Rate 3 | Efficiency 3 | Model #1 |
| 4 | 2 | Rate 4 | Efficiency 4 | Model #1 |
| 5 | 2 | Rate 5 | Efficiency 5 | Model #1 |
| 6 | 2 | Rate 6 | Efficiency 6 | Model #1 |
| 7 | 4 | Rate 7 | Efficiency 7 | Model #1 |
| 8 | 4 | Rate 8 | Efficiency 8 | Model #1 |
| 9 | 4 | Rate 9 | Efficiency 9 | Model #1 |
| 10 | 6 | Rate 10 | Efficiency 10 | Model #1 |
| 11 | 6 | Rate 11 | Efficiency 11 | Model #1 |
| 12 | 6 | Rate 12 | Efficiency 12 | Model #1 |
| 13 | 6 | Rate 13 | Efficiency 13 | Model #1 |

TABLE 10-continued

| Second indicator | Modulation mode | Code rate | Spectral efficiency | Model |
|---|---|---|---|---|
| 14 | 6 | Rate 14 | Efficiency 14 | Model #1 |
| 15 | 6 | Rate 15 | Efficiency 15 | Model #1 |
| 16 | 2 | Rate 0 | Efficiency 0 | Model #2 |
| 17 | 2 | Rate 1 | Efficiency 1 | Model #2 |
| 18 | 2 | Rate 2 | Efficiency 2 | Model #2 |
| 19 | 2 | Rate 3 | Efficiency 3 | Model #2 |
| 20 | 2 | Rate 4 | Efficiency 4 | Model #2 |
| 21 | 2 | Rate 5 | Efficiency 5 | Model #2 |
| 22 | 2 | Rate 6 | Efficiency 6 | Model #2 |
| 23 | 4 | Rate 7 | Efficiency 7 | Model #2 |
| 24 | 4 | Rate 8 | Efficiency 8 | Model #2 |
| 25 | 4 | Rate 9 | Efficiency 9 | Model #2 |
| 26 | 6 | Rate 10 | Efficiency 10 | Model #2 |
| 27 | 6 | Rate 11 | Efficiency 11 | Model #2 |
| 28 | 6 | Rate 12 | Efficiency 12 | Model #2 |
| 29 | 6 | Rate 13 | Efficiency 13 | Model #2 |
| 30 | 6 | Rate 14 | Efficiency 14 | Model #2 |
| 31 | 6 | Rate 15 | Efficiency 15 | Model #2 |

Exemplarily, the first AI parameter is the training-data size required for the terminal to complete one AI training, for example, as shown in table 11. Table 11 shows a correspondence between first indicators and first resource-parameter sets, where the first resource-parameter set is a combination of the modulation mode, the code rate, and the spectral efficiency among the first communication resource parameter and the training-data size required for the terminal to complete one AI training among the first AI parameter. For example, as shown in table 11, an AI/machine learning (ML) training-data size that can be completed by the terminal in one training may include two types: data size 1 and data size 2. Specifically, according to channel estimation on a present wireless channel and available computational resources of the terminal, the terminal may select from table 11 a suitable modulation mode, code rate, spectral efficiency, and AI-training-data size, and transmit a corresponding first indicator to the network device. In addition, the network device determines, according to the first indicator reported by the terminal, a second communication resource parameter and a training-data size that are suitable for the terminal, and transmits a corresponding second indicator to the terminal, as shown in table 12. After receiving the second indicator, the terminal can use the second communication resource parameter and the training-data size scheduled by the network device, to complete an AI task.

TABLE 11

| First indicator | Modulation mode | Code rate | Spectral efficiency | Training data size |
|---|---|---|---|---|
| 0 | QPSK | Rate 0 | Efficiency 0 | Data size 1 |
| 1 | QPSK | Rate 1 | Efficiency 1 | Data size 1 |
| 2 | QPSK | Rate 2 | Efficiency 2 | Data size 1 |
| 3 | QPSK | Rate 3 | Efficiency 3 | Data size 1 |
| 4 | QPSK | Rate 4 | Efficiency 4 | Data size 1 |
| 5 | QPSK | Rate 5 | Efficiency 5 | Data size 1 |
| 6 | QPSK | Rate 6 | Efficiency 6 | Data size 1 |
| 7 | 16QAM | Rate 7 | Efficiency 7 | Data size 1 |
| 8 | 16QAM | Rate 8 | Efficiency 8 | Data size 1 |
| 9 | 16QAM | Rate 9 | Efficiency 9 | Data size 1 |
| 10 | 64QAM | Rate 10 | Efficiency 10 | Data size 1 |
| 11 | 64QAM | Rate 11 | Efficiency 11 | Data size 1 |
| 12 | 64QAM | Rate 12 | Efficiency 12 | Data size 1 |
| 13 | 64QAM | Rate 13 | Efficiency 13 | Data size 1 |
| 14 | 64QAM | Rate 14 | Efficiency 14 | Data size 1 |
| 15 | 64QAM | Rate 15 | Efficiency 15 | Data size 1 |
| 16 | QPSK | Rate 0 | Efficiency 0 | Data size 2 |
| 17 | QPSK | Rate 1 | Efficiency 1 | Data size 2 |

TABLE 11-continued

| First indicator | Modulation mode | Code rate | Spectral efficiency | Training data size |
|---|---|---|---|---|
| 18 | QPSK | Rate 2 | Efficiency 2 | Data size 2 |
| 19 | QPSK | Rate 3 | Efficiency 3 | Data size 2 |
| 20 | QPSK | Rate 4 | Efficiency 4 | Data size 2 |
| 21 | QPSK | Rate 5 | Efficiency 5 | Data size 2 |
| 22 | QPSK | Rate 6 | Efficiency 6 | Data size 2 |
| 23 | 16QAM | Rate 7 | Efficiency 7 | Data size 2 |
| 24 | 16QAM | Rate 8 | Efficiency 8 | Data size 2 |
| 25 | 16QAM | Rate 9 | Efficiency 9 | Data size 2 |
| 26 | 64QAM | Rate 10 | Efficiency 10 | Data size 2 |
| 27 | 64QAM | Rate 11 | Efficiency 11 | Data size 2 |
| 28 | 64QAM | Rate 12 | Efficiency 12 | Data size 2 |
| 29 | 64QAM | Rate 13 | Efficiency 13 | Data size 2 |
| 30 | 64QAM | Rate 14 | Efficiency 14 | Data size 2 |
| 31 | 64QAM | Rate 15 | Efficiency 15 | Data size 2 |

TABLE 12

| Second indicator | Modulation mode | Code rate | Spectral efficiency | Training data |
|---|---|---|---|---|
| 0 | 2 | Rate 0 | Efficiency 0 | Data size 1 |
| 1 | 2 | Rate 1 | Efficiency 1 | Data size 1 |
| 2 | 2 | Rate 2 | Efficiency 2 | Data size 1 |
| 3 | 2 | Rate 3 | Efficiency 3 | Data size 1 |
| 4 | 2 | Rate 4 | Efficiency 4 | Data size 1 |
| 5 | 2 | Rate 5 | Efficiency 5 | Data size 1 |
| 6 | 2 | Rate 6 | Efficiency 6 | Data size 1 |
| 7 | 4 | Rate 7 | Efficiency 7 | Data size 1 |
| 8 | 4 | Rate 8 | Efficiency 8 | Data size 1 |
| 9 | 4 | Rate 9 | Efficiency 9 | Data size 1 |
| 10 | 6 | Rate 10 | Efficiency 10 | Data size 1 |
| 11 | 6 | Rate 11 | Efficiency 11 | Data size 1 |
| 12 | 6 | Rate 12 | Efficiency 12 | Data size 1 |
| 13 | 6 | Rate 13 | Efficiency 13 | Data size 1 |
| 14 | 6 | Rate 14 | Efficiency 14 | Data size 1 |
| 15 | 6 | Rate 15 | Efficiency 15 | Data size 1 |
| 16 | 2 | Rate 0 | Efficiency 0 | Data size 2 |
| 17 | 2 | Rate 1 | Efficiency 1 | Data size 2 |
| 18 | 2 | Rate 2 | Efficiency 2 | Data size 2 |
| 19 | 2 | Rate 3 | Efficiency 3 | Data size 2 |
| 20 | 2 | Rate 4 | Efficiency 4 | Data size 2 |
| 21 | 2 | Rate 5 | Efficiency 5 | Data size 2 |
| 22 | 2 | Rate 6 | Efficiency 6 | Data size 2 |
| 23 | 4 | Rate 7 | Efficiency 7 | Data size 2 |
| 24 | 4 | Rate 8 | Efficiency 8 | Data size 2 |
| 25 | 4 | Rate 9 | Efficiency 9 | Data size 2 |
| 26 | 6 | Rate 10 | Efficiency 10 | Data size 2 |
| 27 | 6 | Rate 11 | Efficiency 11 | Data size 2 |
| 28 | 6 | Rate 12 | Efficiency 12 | Data size 2 |
| 29 | 6 | Rate 13 | Efficiency 13 | Data size 2 |
| 30 | 6 | Rate 14 | Efficiency 14 | Data size 2 |
| 31 | 6 | Rate 15 | Efficiency 15 | Data size 2 |

Exemplarily, the first AI parameter is the training-result reporting period of the terminal with an AI model, for example, as shown in table 13. Table 13 shows a correspondence between first indicators and first resource-parameter sets, where the first resource-parameter set is a combination of the modulation mode, the code rate, and the spectral efficiency among the first communication resource parameter and the training-result reporting period among the first AI parameter. For example, as shown in table 13, an AI-model training-result reporting period that can be used by the terminal to complete one training includes two types: period 1 and period 2. Specifically, according to channel estimation on a present wireless channel and available computational resources of the terminal, the terminal may select a suitable modulation mode, code rate, spectral efficiency, and training-result reporting period, and transmit a corresponding first indicator to the network device. In addition, the network device determines, according to the first indicator reported by the terminal, a second communication resource parameter and a training-result reporting period that are suitable for the terminal, and transmit a corresponding second indicator to the terminal, as shown in table 14. After receiving the second indicator, the terminal can use the second communication resource parameter and the training-result reporting period scheduled by the network device, to complete an AI task.

TABLE 13

| First indicator | Modulation mode | Code rate | Spectral efficiency | Training-result reporting period |
|---|---|---|---|---|
| 0 | QPSK | Rate 0 | Efficiency 0 | Period 1 |
| 1 | QPSK | Rate 1 | Efficiency 1 | Period 1 |
| 2 | QPSK | Rate 2 | Efficiency 2 | Period 1 |
| 3 | QPSK | Rate 3 | Efficiency 3 | Period 1 |
| 4 | QPSK | Rate 4 | Efficiency 4 | Period 1 |
| 5 | QPSK | Rate 5 | Efficiency 5 | Period 1 |
| 6 | QPSK | Rate 6 | Efficiency 6 | Period 1 |
| 7 | 16QAM | Rate 7 | Efficiency 7 | Period 1 |
| 8 | 16QAM | Rate 8 | Efficiency 8 | Period 1 |
| 9 | 16QAM | Rate 9 | Efficiency 9 | Period 1 |
| 10 | 64QAM | Rate 10 | Efficiency 10 | Period 1 |
| 11 | 64QAM | Rate 11 | Efficiency 11 | Period 1 |
| 12 | 64QAM | Rate 12 | Efficiency 12 | Period 1 |
| 13 | 64QAM | Rate 13 | Efficiency 13 | Period 1 |
| 14 | 64QAM | Rate 14 | Efficiency 14 | Period 1 |
| 15 | 64QAM | Rate 15 | Efficiency 15 | Period 1 |
| 16 | QPSK | Rate 0 | Efficiency 0 | Period 2 |
| 17 | QPSK | Rate 1 | Efficiency 1 | Period 2 |
| 18 | QPSK | Rate 2 | Efficiency 2 | Period 2 |
| 19 | QPSK | Rate 3 | Efficiency 3 | Period 2 |
| 20 | QPSK | Rate 4 | Efficiency 4 | Period 2 |
| 21 | QPSK | Rate 5 | Efficiency 5 | Period 2 |
| 22 | QPSK | Rate 6 | Efficiency 6 | Period 2 |
| 23 | 16QAM | Rate 7 | Efficiency 7 | Period 2 |
| 24 | 16QAM | Rate 8 | Efficiency 8 | Period 2 |
| 25 | 16QAM | Rate 9 | Efficiency 9 | Period 2 |
| 26 | 64QAM | Rate 10 | Efficiency 10 | Period 2 |
| 27 | 64QAM | Rate 11 | Efficiency 11 | Period 2 |
| 28 | 64QAM | Rate 12 | Efficiency 12 | Period 2 |
| 29 | 64QAM | Rate 13 | Efficiency 13 | Period 2 |
| 30 | 64QAM | Rate 14 | Efficiency 14 | Period 2 |
| 31 | 64QAM | Rate 15 | Efficiency 15 | Period 2 |

TABLE 14

| Second indicator | Modulation mode | Code rate | Spectral efficiency | Training-result reporting period |
|---|---|---|---|---|
| 0 | 2 | Rate 0 | Efficiency 0 | Period 1 |
| 1 | 2 | Rate 1 | Efficiency 1 | Period 1 |
| 2 | 2 | Rate 2 | Efficiency 2 | Period 1 |
| 3 | 2 | Rate 3 | Efficiency 3 | Period 1 |
| 4 | 2 | Rate 4 | Efficiency 4 | Period 1 |
| 5 | 2 | Rate 5 | Efficiency 5 | Period 1 |
| 6 | 2 | Rate 6 | Efficiency 6 | Period 1 |
| 7 | 4 | Rate 7 | Efficiency 7 | Period 1 |
| 8 | 4 | Rate 8 | Efficiency 8 | Period 1 |
| 9 | 4 | Rate 9 | Efficiency 9 | Period 1 |
| 10 | 6 | Rate 10 | Efficiency 10 | Period 1 |
| 11 | 6 | Rate 11 | Efficiency 11 | Period 1 |
| 12 | 6 | Rate 12 | Efficiency 12 | Period 1 |
| 13 | 6 | Rate 13 | Efficiency 13 | Period 1 |
| 14 | 6 | Rate 14 | Efficiency 14 | Period 1 |
| 15 | 6 | Rate 15 | Efficiency 15 | Period 1 |
| 16 | 2 | Rate 0 | Efficiency 0 | Period 2 |
| 17 | 2 | Rate 1 | Efficiency 1 | Period 2 |
| 18 | 2 | Rate 2 | Efficiency 2 | Period 2 |
| 19 | 2 | Rate 3 | Efficiency 3 | Period 2 |
| 20 | 2 | Rate 4 | Efficiency 4 | Period 2 |
| 21 | 2 | Rate 5 | Efficiency 5 | Period 2 |
| 22 | 2 | Rate 6 | Efficiency 6 | Period 2 |
| 23 | 4 | Rate 7 | Efficiency 7 | Period 2 |
| 24 | 4 | Rate 8 | Efficiency 8 | Period 2 |
| 25 | 4 | Rate 9 | Efficiency 9 | Period 2 |

TABLE 14-continued

| Second indicator | Modulation mode | Code rate | Spectral efficiency | Training-result reporting period |
|---|---|---|---|---|
| 26 | 6 | Rate 10 | Efficiency 10 | Period 2 |
| 27 | 6 | Rate 11 | Efficiency 11 | Period 2 |
| 28 | 6 | Rate 12 | Efficiency 12 | Period 2 |
| 29 | 6 | Rate 13 | Efficiency 13 | Period 2 |
| 30 | 6 | Rate 14 | Efficiency 14 | Period 2 |
| 31 | 6 | Rate 15 | Efficiency 15 | Period 2 |

Exemplarily, according to channel estimation on a present wireless channel and available computational resources of the terminal, the terminal may select a suitable modulation mode, code rate, and computational capability of the terminal to execute an AI operation, and transmit a corresponding first indicator to the network device. In addition, parameters suitable for the terminal that are determined by the network device according to the first indicator reported by the terminal may be a modulation mode and a code rate of the terminal and a computational capability of the terminal to execute an AI operation, or may be a modulation mode and a code rate of the terminal, a computational capability of the terminal to execute an AI operation, and an AI model suitable for the terminal to use. Then the network device transmits a corresponding second indicator to the terminal. After receiving the second indicator, the terminal can use the second communication resource parameter and the training-result reporting period scheduled by the network device, to complete an AI task.

In some possible implementations, the terminal may receive via a PDCCH the second indicator transmitted by the network device, or may receive via a PDSCH the second indicator transmitted by the network device, or may receive via a MAC CE the second indicator transmitted by the network device.

In implementations of the disclosure, the terminal transmits the first indicator to the network device, and the network device receives the first indicator transmitted by the terminal, where the first indicator identifies the first resource-parameter set, the first resource-parameter set includes the first communication resource parameter and the first AI parameter, and the first indicator and the first resource-parameter set are in the first correspondence. In addition, the network device transmits the second indicator to the terminal, and the terminal receives the second indicator transmitted by the network device, where the second indicator identifies the second resource-parameter set, the second resource-parameter set includes the second communication resource parameter and the second AI parameter, and the second indicator and the second resource-parameter set are in the second correspondence. As such, the network device can schedule an optimal combination of wireless communication resource parameter and AI parameter for the terminal according to a wireless channel condition and an AI parameter reported by the terminal, thereby realizing an optimal match between wireless communication resource parameter and AI parameter configuration, and thus avoiding quality degradation of AI services and resource waste caused by mismatch between the two parameters.

Figure 6:
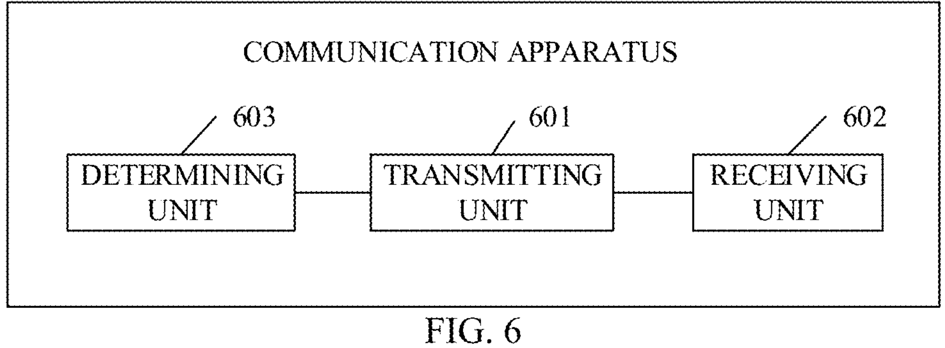
FIG. 6 is a schematic structural diagram of a communication apparatus provided in implementations of the disclosure.

Refer to FIG. 6, which is a schematic structural diagram of a communication apparatus provided in implementations of the disclosure. The apparatus is applicable to a terminal. The apparatus includes a transmitting unit 601. The transmitting unit 601 is configured for the terminal to transmit a first indicator to a network device, where the first indicator identifies a first resource-parameter set, the first resource-parameter set includes a first communication resource parameter and a first AI parameter, and the first indicator and the first resource-parameter set are in a first correspondence.

In some possible implementations, the apparatus further includes a receiving unit 602. The receiving unit 602 is specifically configured for the terminal to receive a second indicator transmitted by the network device, where the second indicator identifies a second resource-parameter set, the second resource-parameter set includes a second communication resource parameter and a second AI parameter, and the second indicator and the second resource-parameter set are in a second correspondence.

In some possible implementations, the first AI parameter and/or the second AI parameter includes at least one of: a computational capability of the terminal to execute an AI operation, an AI model used by the terminal, a split point for the terminal to execute an AI model, AI operation steps of the terminal, a training-data size required for the terminal to complete one AI training, or a period for reporting a training result by the terminal with an AI model.

In some possible implementations, the first communication resource parameter and/or the second communication resource parameter includes at least one of: a modulation mode, a code rate, or a spectral efficiency.

In some possible implementations, the first correspondence is predefined, configured via RRC signaling, configured via system information, or configured via a MAC CE; and the second correspondence is predefined, configured via RRC signaling, configured via system information, or configured via a MAC CE.

In some possible implementations, the apparatus further includes a determining unit 603. The determining unit 603 is specifically configured to determine, by the terminal, the first correspondence from multiple correspondences between first indicators and first resource-parameter sets according to a DCI indication, an RNTI, or a DCI format; and determine, by the terminal, the second correspondence from multiple correspondences between second indicators and second resource-parameter sets according to a DCI indication, an RNTI, or a DCI format.

In some possible implementations, the transmitting unit 601 is specifically configured to transmit, by the terminal, the first indicator to the network device via a PUCCH; transmit, by the terminal, the first indicator to the network device via a PUSCH; or transmit, by the terminal, the first indicator to the network device via a MAC CE.

In some possible implementations, the receiving unit 602 is specifically configured to receive, by the terminal, the second indicator transmitted by the network device via a PDCCH; receive, by the terminal, the second indicator transmitted by the network device via a PDSCH; or receive, by the terminal, the second indicator transmitted by the network device via a MAC CE.

It can be understood that, in implementations of the disclosure, the division of units is illustrative, and is only a division of logical functions, and other manners of division may be available in practice. Various functional units in implementations of the disclosure may be integrated into one processing unit, or may be present as a number of physically separated units, or two or more units may be integrated into one. The integrated unit may be implemented in the form of hardware, or may be implemented in the form of a software functional unit.

Figure 7:
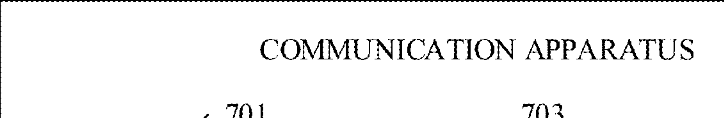
FIG. 7 is a schematic structural diagram of another communication apparatus provided in implementations of the disclosure.
Figure 7:
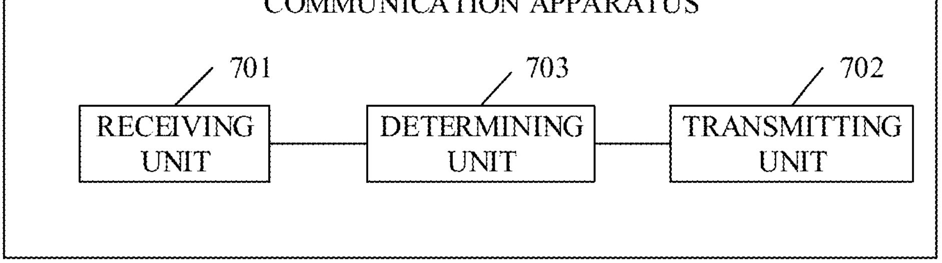

Refer to FIG. 7, which is a schematic structural diagram of a communication apparatus provided in implementations of the disclosure. The apparatus is applicable to a network device. The apparatus includes a receiving unit 701. The receiving unit 701 is configured for the network device to receive a first indicator transmitted by a terminal, where the first indicator identifies a first resource-parameter set, the first resource-parameter set includes a first communication resource parameter and a first AI parameter, and the first indicator and the first resource-parameter set are in a first correspondence.

In some possible implementations, the apparatus further includes a transmitting unit 702. The transmitting unit 702 is specifically configured for the network device to transmit a second indicator to the terminal, where the second indicator identifies a second resource-parameter set, the second resource-parameter set includes a second communication resource parameter and a second AI parameter, and the second indicator and the second resource-parameter set are in a second correspondence.

In some possible implementations, the first AI parameter and/or the second AI parameter includes at least one of: a computational capability of the terminal to execute an AI operation, an AI model used by the terminal, a split point for the terminal to execute an AI model, AI operation steps of the terminal, a training-data size required for the terminal to complete one AI training, or a period for reporting a training result by the terminal with an AI model.

In some possible implementations, the first communication resource parameter and/or the second communication resource parameter includes at least one of: a modulation mode, a code rate, or a spectral efficiency.

In some possible implementations, the first correspondence is predefined, configured via RRC signaling, configured via system information, or configured via a MAC CE; and the second correspondence is predefined, configured via RRC signaling, configured via system information, or configured via a MAC CE.

In some possible implementations, the apparatus further includes a determining unit 703. The first correspondence is determined by the terminal from multiple correspondences between first indicators and first resource-parameter sets according to a DCI indication, an RNTI, or a DCI format. The second correspondence is determined by the terminal from multiple correspondences between second indicators and second resource-parameter sets according to a DCI indication, an RNTI, or a DCI format.

In some possible implementations, the receiving unit 701 is specifically configured to receive, by the network device, the first indicator transmitted by the terminal via a PUCCH; receive, by the network device, the first indicator transmitted by the terminal via a PUSCH; or receive, by the network device, the first indicator transmitted by the terminal via a MAC CE.

In some possible implementations, the transmitting unit 702 is further configured to transmit, by the network device, the second indicator to the terminal via a PDCCH; transmit, by the network device, the second indicator to the terminal via a PDSCH; or transmit, by the network device, the second indicator to the terminal via a MAC CE.

It can be understood that, in implementations of the disclosure, the division of units is illustrative, and is only a division of logical functions, and other manners of division may be available in practice. Various functional units in implementations of the disclosure may be integrated into one processing unit, or may be present as a number of physically separated units, or two or more units may be integrated into one. The integrated unit may be implemented in the form of hardware, or may be implemented in the form of a software functional unit.

Figure 8:
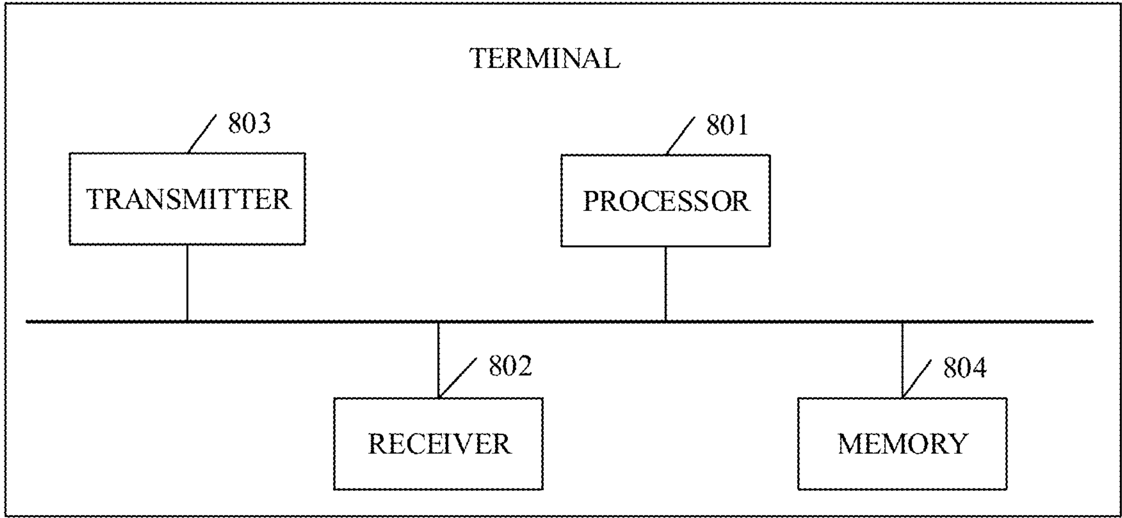
FIG. 8 is a schematic structural diagram of a terminal provided in implementations of the disclosure.

Refer to FIG. 8, which is a schematic structural diagram of a terminal provided in implementations of the disclosure. The terminal illustrated in FIG. 8 may include a processor 801, a receiver 802, a transmitter 803, and a memory 804. The processor 801, the receiver 802, the transmitter 803, and the memory 804 each are coupled with a bus. The memory 804 is configured to store computer programs, where the computer programs include program instructions. The processor 801 is configured to execute the program instructions stored in the memory 804.

In implementations of the disclosure, the processor 801 is configured to execute executable program codes stored in the memory 804 to: transmit, by the terminal, a first indicator to the network device via the transmitter 803. The first indicator identifies a first resource-parameter set, the first resource-parameter set includes a first communication resource parameter and a first AI parameter, and the first indicator and the first resource-parameter set are in a first correspondence.

In some possible implementations, the processor 801 is further configured for the terminal to receive, via the receiver 802, a second indicator transmitted by the network device. The second indicator identifies a second resource-parameter set, the second resource-parameter set includes a second communication resource parameter and a second AI parameter, and the second indicator and the second resource-parameter set are in a second correspondence.

In some possible implementations, the first AI parameter and/or the second AI parameter includes at least one of: a computational capability of the terminal to execute an AI operation, an AI model used by the terminal, a split point for the terminal to execute an AI model, AI operation steps of the terminal, a training-data size required for the terminal to complete one AI training, or a period for reporting a training result by the terminal with an AI model.

In some possible implementations, the first communication resource parameter and/or the second communication resource parameter includes at least one of: a modulation mode, a code rate, or a spectral efficiency.

In some possible implementations, the first correspondence is predefined, configured via RRC signaling, configured via system information, or configured via a MAC CE; and the second correspondence is predefined, configured via RRC signaling, configured via system information, or configured via a MAC CE.

In some possible implementations, the processor 801 is further configured to determine, by the terminal, the first correspondence from multiple correspondences between first indicators and first resource-parameter sets according to a DCI indication, an RNTI, or a DCI format; and determine, by the terminal, the second correspondence from multiple correspondences between second indicators and second resource-parameter sets according to a DCI indication, an RNTI, or a DCI format.

In some possible implementations, the processor 801 is specifically configured to transmit, by the terminal, the first indicator to the network device via a PUCCH with the transmitter 803; transmit, by the terminal, the first indicator to the network device via a PUSCH with the transmitter 803; or transmit, by the terminal, the first indicator to the network device via a MAC CE with the transmitter 803.

In some possible implementations, the processor 801 is specifically configured to receive, by the terminal, the second indicator transmitted by the network device via a PDCCH with the receiver 802; receive, by the terminal, the second indicator transmitted by the network device via a PDSCH with the receiver 802; or receive, by the terminal, the second indicator transmitted by the network device via a MAC CE with the receiver 802.

Figure 9:
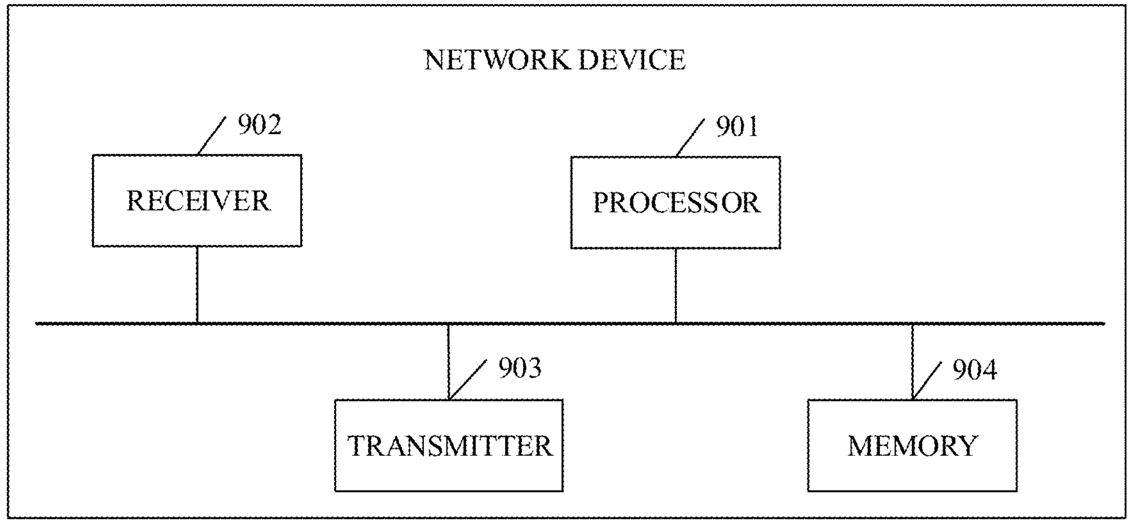
FIG. 9 is a schematic structural diagram of a network device provided in implementations of the disclosure.

Refer to FIG. 9, which is a schematic structural diagram of a network device provided in implementations of the disclosure. The network device illustrated in FIG. 9 may include a processor 901, a receiver 902, a transmitter 903, and a memory 904. The processor 901, the receiver 902, the transmitter 903, and the memory 904 each are coupled with a bus. The memory 904 is configured to store computer programs, where the computer programs include program instructions. The processor 901 is configured to execute the program instructions stored in the memory 904.

In implementations of the disclosure, the processor 901 is configured to execute executable program codes stored in the memory 904 to: receive, by the network device, a first indicator transmitted by a terminal via the receiver 902, where the first indicator identifies a first resource-parameter set, the first resource-parameter set includes a first communication resource parameter and a first AI parameter, and the first indicator and the first resource-parameter set are in a first correspondence.

In some possible implementations, the processor 901 is further configured for the network device to transmit a second indicator to the terminal via the transmitter 903, where the second indicator identifies a second resource-parameter set, the second resource-parameter set includes a second communication resource parameter and a second AI parameter, and the second indicator and the second resource-parameter set are in a second correspondence.

In some possible implementations, the first AI parameter and/or the second AI parameter includes at least one of: a computational capability of the terminal to execute an AI operation, an AI model used by the terminal, a split point for the terminal to execute an AI model, AI operation steps of the terminal, a training-data size required for the terminal to complete one AI training, or a period for reporting a training result by the terminal with an AI model.

In some possible implementations, the first communication resource parameter and/or the second communication resource parameter includes at least one of: a modulation mode, a code rate, or a spectral efficiency.

In some possible implementations, the first correspondence is predefined, configured via RRC signaling, configured via system information, or configured via a MAC CE; and the second correspondence is predefined, configured via RRC signaling, configured via system information, or configured via a MAC CE.

In some possible implementations, the first correspondence is determined by the terminal from multiple correspondences between first indicators and first resource-parameter sets according to a DCI indication, an RNTI, or a DCI format. The second correspondence is determined by the terminal from multiple correspondences between second indicators and second resource-parameter sets according to a DCI indication, an RNTI, or a DCI format.

In some possible implementations, the processor 901 is specifically configured to receive, by the network device, the first indicator transmitted by the terminal via a PUCCH with the receiver 902; receive, by the network device, the first indicator transmitted by the terminal via a PUSCH with the receiver 902; or receive, by the network device, the first indicator transmitted by the terminal via a MAC CE with the receiver 902.

In some possible implementations, the processor 901 is specifically configured to transmit, by the network device, the second indicator to the terminal via a PDCCH with the transmitter 903; transmit, by the network device, the second indicator to the terminal via a PDSCH with the transmitter 903; or transmit, by the network device, the second indicator to the terminal via a MAC CE with the transmitter 903.

Implementations of the disclosure further provide a computer storage medium. The computer storage medium is configured to store program instructions which, when executed, may include some or all operations of the communication method in implementations illustrated in FIG. 2 or FIG. 5.

Implementations of the disclosure further provide a computer program product. The computer program product includes a non-transitory computer-readable storage medium storing computer programs. The computer programs are operable with a computer to implement some or all operations performed by the terminal or the network device described in the foregoing method implementations. The computer program product may be a software installation package.

The steps of the method or algorithm described in implementations of the disclosure may be implemented by means of hardware, or may be implemented by executing software instructions by a processor. The software instructions can be implemented by corresponding software modules, which can be stored in a random access memory (RAM), a flash memory, a read only memory (ROM), an erasable programmable ROM (EPROM), an electrically EPROM (EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an application-specific integrated circuit (ASIC). In addition, the ASIC can be located in a communication apparatus such as the terminal. The processor and the storage medium may also be present as discrete components in the communication apparatus.

It can be understood that, the "first", "second", and various numerical numbers involved in the disclosure are only intended for distinction for the convenience of illustration, rather than limiting the scope of the implementations of the disclosure.

It can be understood that, in various implementations of the disclosure, the magnitude of a sequence number of each process does not mean an order of execution, and the order of execution of each process should be determined by its function and an internal logic and shall not constitute any limitation to an implementation process of implementations of the disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A communication method, comprising:

transmitting, by a terminal, a first indicator to a network device, the first indicator identifying a first parameter set, the first parameter set comprising a first communication resource parameter and a first artificial intelligence (AI) parameter, and the first indicator and the first parameter set being in a first correspondence; and determining, by the terminal, the first correspondence from a plurality of correspondences between the first indicator and the first parameter set according to downlink control information (DCI), a radio network temporary identity (RNTI), or a DCI format;

wherein in each of the plurality of correspondences, each value of the first indicator maps to a unique combination of values of the communication resource parameter and the AI parameter in the first parameter set, wherein the plurality of correspondences share a same type of communication resource parameter and each have a different type of AI parameter, wherein the first correspondence is indicated through the DCI, RNTI, or DCI format indicates by indicating the type of the AI parameter.

2. The method of claim 1, wherein after transmitting, by the terminal, the first indicator to the network device, the method further comprises:

receiving, by the terminal, a second indicator transmitted by the network device, wherein the second indicator identifies a second parameter set, the second parameter set comprises a second communication resource parameter and a second AI parameter, and the second indicator and the second parameter set are in a second correspondence.

3. The method of claim 2, wherein the first AI parameter and/or the second AI parameter comprises at least one of: a computational capability of the terminal to execute an AI operation, an AI model used by the terminal, a split point for the terminal to execute an AI model, AI operation steps of the terminal, a training-data size required for the terminal to complete one AI training, or a period for reporting a training result by the terminal with an AI model.

4. The method of claim 2, wherein the first communication resource parameter and/or the second communication resource parameter comprises at least one of: a modulation mode, a code rate, or a spectral efficiency.

5. The method of claim 2, further comprising:

determining, by the terminal, the second correspondence from a plurality of correspondences between second indicators and second parameter sets according to a DCI indication, an RNTI, or a DCI format.

6. The method of claim 1, wherein transmitting, by the terminal, the first indicator to the network device comprises:

transmitting, by the terminal, the first indicator to the network device via a physical uplink control channel (PUCCH);

transmitting, by the terminal, the first indicator to the network device via a physical uplink shared channel (PUSCH); or transmitting, by the terminal, the first indicator to the network device via a MAC CE.

7. The method of claim 2, wherein receiving, by the terminal, the second indicator transmitted by the network device comprises:

receiving, by the terminal, the second indicator transmitted by the network device via a physical downlink control channel (PDCCH);

receiving, by the terminal, the second indicator transmitted by the network device via a physical downlink shared channel (PDSCH); or receiving, by the terminal, the second indicator transmitted by the network device via a MAC CE.

8. A network device, comprising:

a transceiver;

a processor; and a memory storing computer programs which, when executed by the processor, are operable with the transceiver to:

receive a first indicator transmitted by a terminal, the first indicator identifying a first parameter set, the first parameter set comprising a first communication resource parameter and a first artificial intelligence (AI) parameter, and the first indicator and the first parameter set being in a first correspondence;

wherein the first correspondence is predefined, configured via radio resource control (RRC) signaling, configured via system information, or configured via a media access control-control element (MAC CE);

wherein the first correspondence belongs to a plurality of correspondences, in each of the plurality of correspondences, each value of the first indicator maps to a unique combination of values of the communication resource parameter and the AI parameter in the first parameter set, wherein the plurality of correspondences share a same type of communication resource parameter and each have a different type of AI parameter, wherein the first correspondence is indicated through downlink control information (DCI), a radio network temporary identity (RNTI), or a DCI format by indicating the type of the AI parameter.

9. The network device of claim 8, wherein when executed by the processor, the computer programs are further operable with the transceiver to:

transmit a second indicator to the terminal, wherein the second indicator identifies a second parameter set, the second parameter set comprises a second communication resource parameter and a second AI parameter, and the second indicator and the second parameter set are in a second correspondence.

10. The network device of claim 9, wherein the first AI parameter and/or the second AI parameter comprises at least one of: a computational capability of the terminal to execute an AI operation, an AI model used by the terminal, a split point for the terminal to execute an AI model, AI operation steps of the terminal, a training-data size required for the terminal to complete one AI training, or a period for reporting a training result by the terminal with an AI model.

11. The network device of claim 9, wherein:

the second correspondence is predefined, configured via RRC signaling, configured via system information, or configured via a MAC CE.

12. The network device of claim 8, wherein:

the first indicator transmitted by the terminal is received via a physical uplink control channel (PUCCH);

the first indicator transmitted by the terminal is received via a physical uplink shared channel (PUSCH); or the first indicator transmitted by the terminal is received via a MAC CE.

13. The network device of claim 9, wherein:

the second indicator is transmitted to the terminal via a physical downlink control channel (PDCCH);

the second indicator is transmitted to the terminal via a physical downlink shared channel (PDSCH); or the second indicator is transmitted to the terminal via a MAC CE.

14. A terminal, comprising:

a transceiver;

a processor; and a memory storing computer programs which, when executed by the processor, are operable with the transceiver to:

transmit a first indicator to a network device, the first indicator identifying a first parameter set, the first parameter set comprising a first communication resource parameter and a first artificial intelligence (AI) parameter, and the first indicator and the first parameter set being in a first correspondence;

determine the first correspondence from a plurality of correspondences between first indicators and first parameter sets according to a downlink control information (DCI) indication, a radio network temporary identity (RNTI), or a DCI format;

wherein in each of the plurality of correspondences, each value of the first indicator maps to a unique combination of values of the communication resource parameter and the AI parameter in the first parameter set, wherein the plurality of correspondences share a same type of communication resource parameter and each have a different type of AI parameter, wherein the first correspondence is indicated through the DCI, RNTI, or DCI format indicates by indicating the type of the AI parameter.

15. The terminal of claim 14, wherein when executed by the processor, the computer programs are further operable with the transceiver to:

receive a second indicator transmitted by the network device, wherein the second indicator identifies a second parameter set, the second parameter set comprises a second communication resource parameter and a second AI parameter, and the second indicator and the second parameter set are in a second correspondence.

16. The terminal of claim 15, wherein the first AI parameter and/or the second AI parameter comprises at least one of: a computational capability of the terminal to execute an AI operation, an AI model used by the terminal, a split point for the terminal to execute an AI model, AI operation steps of the terminal, a training-data size required for the terminal to complete one AI training, or a period for reporting a training result by the terminal with an AI model.

17. The terminal of claim 15, wherein the first communication resource parameter and/or the second communication resource parameter comprises at least one of: a modulation mode, a code rate, or a spectral efficiency.

18. The terminal of claim 15, when executed by the processor, the computer programs are operable with the processor to:

determine the second correspondence from a plurality of correspondences between second indicators and second parameter sets according to a DCI indication, an RNTI, or a DCI format.

19. The terminal of claim 14, wherein:

the first indicator is transmitted to the network device via a physical uplink control channel (PUCCH);

the first indicator is transmitted to the network device via a physical uplink shared channel (PUSCH); or the first indicator is transmitted to the network device via a MAC CE.

20. The terminal of claim 15, wherein:

the second indicator transmitted by the network device is received via a physical downlink control channel (PDCCH);

the second indicator transmitted by the network device is received via a physical downlink shared channel (PDSCH); or the second indicator transmitted by the network device is received via a MAC CE.

* * * * *